(12) United States Patent
Hasegawa et al.

(10) Patent No.: US 7,106,559 B2
(45) Date of Patent: Sep. 12, 2006

(54) EXCHANGE COUPLING FILM AND MAGNETORESISTIVE ELEMENT USING THE SAME

(75) Inventors: Naoya Hasegawa, Niigata-ken (JP); Masamichi Saito, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/208,368

(22) Filed: Aug. 17, 2005

(65) Prior Publication Data

US 2006/0023374 A1    Feb. 2, 2006

Related U.S. Application Data

(62) Division of application No. 09/901,438, filed on Jul. 9, 2001.

(30) Foreign Application Priority Data

Jul. 11, 2000    (JP)    ............... 2000-209468

(51) Int. Cl.
    *G11B 5/66*    (2006.01)
(52) U.S. Cl. ............... 360/324.11; 360/324.12; 428/810
(58) Field of Classification Search ............... None
    See application file for complete search history.

(56) References Cited

U.S. PATENT DOCUMENTS

| 4,103,315 A | 7/1978 | Hempstead et al. |
|---|---|---|
| 5,315,468 A | 5/1994 | Lin et al. |
| 5,549,978 A | 8/1996 | Iwasaki et al. |
| 5,736,264 A * | 4/1998 | Ishiwata et al. ............ 428/812 |
| 5,910,868 A | 6/1999 | Kurosawa et al. |
| 5,942,309 A | 8/1999 | Kamijo |
| 5,948,550 A * | 9/1999 | Fujii et al. .................. 428/680 |
| 6,055,135 A | 4/2000 | Fukamichi et al. |
| 6,057,049 A | 5/2000 | Fuke et al. |
| 6,303,218 B1 * | 10/2001 | Kamiguchi et al. ......... 360/313 |
| 6,338,899 B1 | 1/2002 | Fukuzawa et al. |
| 2002/0008947 A1 | 1/2002 | Hasegawa et al. |

FOREIGN PATENT DOCUMENTS

| JP | 10-214716 | 8/1998 |
|---|---|---|
| JP | 11-191647 | 7/1999 |
| JP | 2000022239 A * | 1/2000 |
| JP | 2000-150235 | 5/2000 |

* cited by examiner

*Primary Examiner*—Andrea Wellington
*Assistant Examiner*—Christopher R. Magee
(74) *Attorney, Agent, or Firm*—Brinks Hofer Gilson & Lione

(57) ABSTRACT

An exchange coupling film including an antiferromagnetic layer and a ferromagnetic layer in contact with the antiferromagnetic layer so as to generate an exchange coupling magnetic field is provided. A PtMn alloy is used as the material of the antiferromagnetic layer. Crystal planes of the antiferromagnetic layer and the ferromagnetic layer preferentially aligned parallel to the interface are crystallographically identical and crystallographically identical axes lying in these crystal planes are oriented, at least partly, in different directions between the antiferromagnetic layer and the ferromagnetic layer. Thus, a proper order transformation occurs in the antiferromagnetic layer as a result of heat treatment and an increased exchange coupling magnetic field can be obtained.

16 Claims, 18 Drawing Sheets

EXCHANGE COUPLING FILM AND MAGNETORESISTIVE ELEMENT USING THE SAME

This application is a divisional application of pending application Ser. No. 09/901,438, filed on Jul. 9, 2001, which claims the benefit of priority to Japanese Patent Application No. 2000-209468, filed Jul. 11, 2000, incorporated herein by reference.

BACKGROUND OF THE INVENTION

1. Field of the Invention

The present invention relates to an exchange coupling film comprising an antiferromagnetic layer and a ferromagnetic layer, in which the magnetization vector of the ferromagnetic layer is oriented in a particular direction by an exchange coupling magnetic field generated at the interface between the antiferromagnetic layer and the ferromagnetic layer. The present invention is particularly directed to an exchange coupling film having a strong exchange coupling magnetic field, a magnetoresistive element (spin valve thin-film element or AMR element) employing the exchange coupling film, and a thin-film magnetic head incorporating the magnetoresistive element.

2. Description of the Related Art

A spin-valve thin-film magnetic head is a type of giant magnetoresistive element (GMR) which utilizes the giant magnetoresistive effect. The spin-valve thin-film magnetic head detects a recorded magnetic field from a recording medium such as a hard disk.

The spin-valve thin-film magnetic head is preferred for its relatively simple structure compared to other GMR elements and its ability to change the resistance in response to a weak magnetic field.

The simplest type of spin-valve thin-film magnetic head comprises an antiferromagnetic layer, a pinned magnetic layer, a nonmagnetic interlayer, and a free magnetic layer.

The antiferromagnetic layer and the pinned magnetic layer are in contact with each other. An exchange anisotropic magnetic field generated at the interface between the antiferromagnetic layer and the pinned magnetic layer puts the magnetization vector of the pinned magnetic layer into a single domain state, thus pinning the magnetization vector.

The magnetization vector of the free magnetic layer is oriented in a direction substantially orthogonal to the magnetization vector of the pinned magnetic layer by bias layers formed on two sides of the free magnetic layer.

The antiferromagnetic layer is typically composed of an Fe—Mn alloy, a Ni—Mn alloy, or a Pt—Mn alloy. The Pt—Mn alloy is particularly preferable since this alloy has a high blocking temperature, excellent corrosion resistance, and other advantageous features.

The inventors have found that even when the PtMn alloy is used in the antiferromagnetic layer, there are some instances where an exchange coupling magnetic field generated between the antiferromagnetic layer and the pinned magnetic layer has a reduced intensity.

When the antiferromagnetic layer is composed of the PtMn alloy, the disordered lattice of the antiferromagnetic layer can be transformed into an ordered lattice by thermally treating the antiferromagnetic layer and the pinned magnetic layer subsequent to their deposition, so as to generated an exchange coupling magnetic field.

However, when the atoms of the antiferromagnetic material constituting the antiferromagnetic layer and the atoms of the soft magnetic material constituting the pinned magnetic layer exhibit a one-to-one correspondence (lattice matching) at the interface between the antiferromagnetic layer and the pinned magnetic layer, the transformation into an ordered lattice does not occur properly in the antiferromagnetic layer. As a result, it becomes impossible to obtain an increased exchange coupling magnetic field.

The above-described lattice matching is considered to occur when the crystal orientations of the antiferromagnetic layer and the pinned magnetic layer are coincident with each other at the interface thereof. An example of such an instance is when the one of the {111} planes of the antiferromagnetic layer is preferentially aligned parallel to the interface with the pinned magnetic layer at the same time one of the {111} planes of the pinned magnetic layer is preferentially aligned in a direction parallel to the above-described interface.

SUMMARY OF THE INVENTION

Accordingly, it is an object of the present invention to provide an exchange coupling film overcoming the above-described drawbacks of the conventional art. The exchange coupling film of the present invention generates an increased exchange anisotropic magnetic field when an antiferromagnetic material containing X (X is a platinum group element) and Mn is used in an antiferromagnetic layer. A magnetoresistive element using the exchange coupling film and the thin-film magnetic head incorporating the magnetoresistive element are also provided.

To achieve the above-described object, an exchange coupling film according to an aspect of the present invention has an antiferromagnetic layer and a ferromagnetic layer in contact with the antiferromagnetic layer. An exchange coupling magnetic field generated at the interface between the antiferromagnetic layer and the ferromagnetic layer magnetizes the antiferromagnetic layer in a particular direction. The antiferromagnetic layer includes an antiferromagnetic material containing Mn and X, wherein X is at least one element selected from the group consisting of Pt, Pd, Ir, Rh, Ru, and Os. Crystal planes of the antiferromagnetic layer and the ferromagnetic layer, preferentially aligned parallel to the interface, are crystallographically identical, and crystallographically identical axes lying in said crystal planes are oriented, at least partly, in different directions between the antiferromagnetic layer and the ferromagnetic layer. The above-described crystal planes are preferably the crystallographically identical planes generically described as the {111} planes. The crystallographically identical axes are preferably the axes generically described as the <110> axes.

According to the present invention, a proper order transformation occurs in the antiferromagnetic layer through heat treatment, and an increased exchange coupling magnetic field can be generated, even when the crystal planes of the antiferromagnetic layer and the ferromagnetic layer preferentially aligned parallel to the layer surface are crystallographically identical.

In the present invention, the crystallographically identical axes lying in the above-described crystal planes are oriented, at least partly, in different directions between the antiferromagnetic layer and the ferromagnetic layer.

In the present invention, the crystal planes in the antiferromagnetic layer and the ferromagnetic layer, preferentially aligned parallel to the layer surface are crystallographically identical, and the crystallographically identical axes lying in these crystal planes are oriented, at least partly, in different directions between the antiferromagnetic layer and the ferromagnetic layer. These crystal orientations can be identified from transmission electron beam diffraction diagrams.

Another aspect of the present invention provides an exchange coupling film having an antiferromagnetic layer and a ferromagnetic layer in contact with the antiferromagnetic layer, an exchange coupling magnetic field generated at the interface between the antiferromagnetic layer and the ferromagnetic layer magnetizing the ferromagnetic layer in a particular direction. Diffraction spots corresponding to reciprocal lattice points indicative of crystal planes of the antiferromagnetic layer and the ferromagnetic layer appear in transmission electron beam diffraction diagrams of the antiferromagnetic layer and the ferromagnetic layer, which are obtained by using an electron beam in a direction parallel to the interface. The first imaginary lines in the diffraction diagrams of the antiferromagnetic layer and the ferromagnetic layer are coincident with each other, the first imaginary lines each connecting a beam origin and a particular one of the diffraction spots, which is given the same label in both the diffraction diagrams of the antiferromagnetic layer and the ferromagnetic layer, and which is located in a layer thickness direction when viewed from the beam origin. The second imaginary line in the diffraction diagrams of the antiferromagnetic layer and the ferromagnetic layer are not coincident with each other, the second imaginary lines each connecting the beam origin and a particular one of the diffraction spots, which is given the same label in both the diffraction diagrams of the antiferromagnetic layer and the ferromagnetic layer, and which is located in a direction other than the layer thickness direction when viewed from the beam origin.

The present invention also provides an exchange coupling film including an antiferromagnetic layer and a ferromagnetic layer in contact with the antiferromagnetic layer, in which an exchange coupling magnetic field generated at the interface between the antiferromagnetic layer and the ferromagnetic layer orients the magnetization vector of the ferromagnetic layer in a particular direction, and in which diffraction spots corresponding to reciprocal lattice points indicative of crystal planes of the antiferromagnetic layer and the ferromagnetic layer appear in transmission electron beam diffraction diagrams of the antiferromagnetic layer and the ferromagnetic layer obtained using an electron beam in a direction parallel to the interface. The first imaginary lines in the diffraction diagrams of the antiferromagnetic layer and the ferromagnetic layer are coincident with each other, the first imaginary lines each connecting a beam origin and a particular one of the diffraction spots, which is given the same label in both the diffraction diagrams of the antiferromagnetic layer and the ferromagnetic layer, and is located in a layer thickness direction when viewed from the beam origin. A particular diffraction spot indicative of a particular crystal plane, located in a direction other than the layer thickness direction, appears only in one of the diffraction diagrams of the antiferromagnetic layer and the ferromagnetic layer.

Preferably, the diffraction spots located in the layer thickness direction are assigned to the {111} planes.

In this embodiment, the crystal orientations of the antiferromagnetic layer and the ferromagnetic layer are determined by transmission electron beam diffraction diagrams obtained using an electron beam entering in a direction parallel to the interface.

Herein, the transmission electron beam diffraction diagrams refer to the diagrams obtained using a transmission electron beam microscope or the like. The diffraction diagrams present diffraction phenomena brought about by the scattering of the electron beam (Bragg reflection) when the electron beam is entered and transmitted through the test subjects.

The diffraction spots appearing in the above diffraction diagrams are labeled based on the labeled diffraction patterns of typical single crystal structures. The crystal orientations of the antiferromagnetic layer and the ferromagnetic layer can be examined through the diffraction diagrams.

The present invention further provides an exchange coupling film having an antiferromagnetic layer and a ferromagnetic layer in contact with the antiferromagnetic layer in which an exchange coupling magnetic field generated at the interface between the antiferromagnetic layer and the ferromagnetic layer magnetizing the ferromagnetic layer in a particular direction. Diffraction spots corresponding to reciprocal lattice points indicative of crystal planes of the antiferromagnetic layer and the ferromagnetic layer appear in transmission electron beam diffraction diagrams of the antiferromagnetic layer and the ferromagnetic layer obtained using an electron beam in a direction perpendicular to the interface. An imaginary line in the diffraction diagram of the antiferromagnetic layer connecting a beam origin and a diffraction spot given a particular label and an imaginary line in the diffraction diagram of the ferromagnetic layer connecting the beam origin and a diffraction spot given the same label are not coincident with each other.

Alternatively, among the above-described diffraction spots, a diffraction spot given a particular label may appear only in one of the diffraction diagrams of the antiferromagnetic layer and the ferromagnetic layer.

Preferably, the direction perpendicular to the above-described interface is the direction of the crystallographically identical crystal axes generically described as the <111> axes.

In this embodiment, the antiferromagnetic layer and the ferromagnetic layer preferably has one of the crystallographically identical planes, generically described as the {111} planes, preferentially aligned parallel to the interface of the antiferromagnetic layer and the ferromagnetic layer, and the transmission electron beam diffraction diagrams are obtained using an electron beam perpendicular to the interface.

In order to achieve the above-described crystal orientation, a seed layer may be provided in the exchange-coupling film of the present invention.

Preferably, the exchange coupling film according to the present invention further has a seed layer provided below the antiferromagnetic layer. The seed layer mainly has a face-centered cubic structure and has a crystal plane crystallographically identical to the (111) plane preferentially aligned parallel to the interface.

By providing a seed layer below the antiferromagnetic layer, one of the crystallographically identical planes generically described as the {111} planes can be preferentially aligned parallel to the layer surface in each of the antiferromagnetic layer and the ferromagnetic layer. When the crystallographically identical planes are aligned parallel to the layer surface, an increased rate of change in resistance ($\Delta R/R$) compared to the conventional technology can be obtained.

Preferably, the seed layer includes one of a NiFe alloy and a Ni—Fe—Y alloy, wherein Y is at least one element selected from the group consisting of Cr, Rh, Ta, Hf, Nb, Zr, and Ti. The seed layer is preferably nonmagnetic at room temperature.

Preferably, an underlayer is provided under the seed layer. The underlayer preferably contains at least one element selected from the group consisting of Ta, Hf, Nb, Zr, Ti, Mo, and W.

Preferably, at least part of the interface between the antiferromagnetic layer and the seed layer is in a lattice-mismatching state.

In this invention, the antiferromagnetic material preferably further contains X', wherein X' is at least one element selected from the group consisting of Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Sn, Hf, Ta, W, Re, Au, Pb, and rare earth elements. Preferably, the antiferromagnetic material is an interstitial solid solution in which this X' is inserted to interstices in the lattice formed by X and Mn, or a substitutional solid solution in which this X' partly displaces the lattice points in the crystal lattice formed by X and Mn. In this manner, the lattice constant of the antiferromagnetic layer can be increased, and it becomes possible to prevent a one-to-one correspondence in the atomic arrangements between the antiferromagnetic layer and the ferromagnetic layer.

In order to make the exchange coupling film having the above-described crystal orientations, the ratio of each component constituting the antiferromagnetic layer is important.

In order to obtain an increased exchange coupling magnetic field, at least part of the interface between the antiferromagnetic layer and the ferromagnetic layer needs to be in a lattice-mismatching state, and a proper order transformation needs to be achieved in the antiferromagnetic layer as a result of heat treatment. Whether or not such lattice-mismatching state and the proper order transformation are achieved mainly depends on the composition of the antiferromagnetic layer.

In the present invention, the X or X+X' content in the antiferromagnetic material is preferably in the range of 45 to 60 atomic percent. In this manner, an exchange coupling magnetic field of $1.58 \times 10^4$ (A/m) or more can be obtained. More preferably the X or X+X' content in the antiferromagnetic material is in the range of 49 to 56.5 atomic percent. In this manner, an exchange coupling magnetic field of $7.9 \times 10^4$ (A/m) or more can be obtained.

By setting the ratio of the components in the above-described ranges, the interface between the antiferromagnetic layer and the ferromagnetic layer can keep the lattice-mismatching state and a proper order transformation can be developed in the antiferromagnetic layer as a result of heat treatment.

After the heat treatment, the crystal planes of the antiferromagnetic layer and the ferromagnetic layer preferentially aligned parallel to the layer surface are crystallographically identical. Moreover, the crystal axes lying in these crystal planes are oriented, at least partly, in different directions between the antiferromagnetic layer and the ferromagnetic layer.

In this invention, at least part of the interface between the antiferromagnetic layer and the ferromagnetic layer is in a lattice-mismatching state after the heat treatment.

The exchange coupling film of the present invention can be applied to various types of magnetoresistive elements.

A magnetoresistive element incorporating the exchange coupling film of the present invention has the exchange coupling film of the present invention, a free magnetic layer formed on the pinned magnetic layer separated by a nonmagnetic interlayer, and bias layers for magnetizing the free magnetic layer in a direction substantially orthogonal to the magnetization vector of the pinned magnetic layer.

The present invention also provides a magnetoresistive element having an antiferromagnetic layer, a pinned magnetic layer in contact with the antiferromagnetic layer, the magnetization vectors of the pinned magnetic layer being pinned by an exchange anisotropic magnetic field generated in relation to the antiferromagnetic layer, a free magnetic layer formed on the pinned magnetic layer separated by a nonmagnetic interlayer, and antiferromagnetic exchange bias layers formed above or below the free magnetic layer, the exchange bias layers being separated from one another in a track width direction by a gap therebetween. The exchange bias layers and the free magnetic layer are composed of the exchange coupling film of the present invention, the exchange bias layers corresponding to the antiferromagnetic layer and the free magnetic layer corresponding to the ferromagnetic layer, so as to magnetize the free magnetic layer in a particular direction.

The present invention also provides a magnetoresistive element including nonmagnetic interlayers provided above and below a free magnetic layer, pinned magnetic layers, one thereof being provided on the pinned magnetic layer formed on the free magnetic layer and the other being provided under the pinned magnetic layer formed under the free magnetic layer, antiferromagnetic layers for pinning the magnetization vectors of the pinned magnetic layers, one of the antiferromagnetic layers being provided on one of the pinned magnetic layers and the other being provided under the other of the pinned magnetic layers, and bias layers for orienting the magnetization vector of the free magnetic layer in a direction substantially orthogonal to the magnetization vector of the pinned magnetic layer. Each antiferromagnetic layer and the pinned magnetic layer in contact with the antiferromagnetic layer is constituted from an exchange coupling film of the present invention, the pinned magnetic layer corresponding to the ferromagnetic layer.

The present invention further provides a magnetoresistive element having a magnetoresistive layer, a soft magnetic layer provided on the magnetoresistive layer separated by a nonmagnetic layer therebetween, and antiferromagnetic layers provided above or below the magnetoresistive layer, the antiferromagnetic layers being separated from one another in a track width direction with a gap therebetween. The antiferromagnetic layers and the magnetoresistive layer are constituted from the exchange coupling film of the present invention, the magnetoresistive layer corresponding to the ferromagnetic layer.

The present invention also provides a thin-film magnetic head in which shield layers are formed above and below the above-described magnetoresistive element with gap layers therebetween.

DESCRIPTION OF THE PREFERRED EMBODIMENTS

Figure 1:
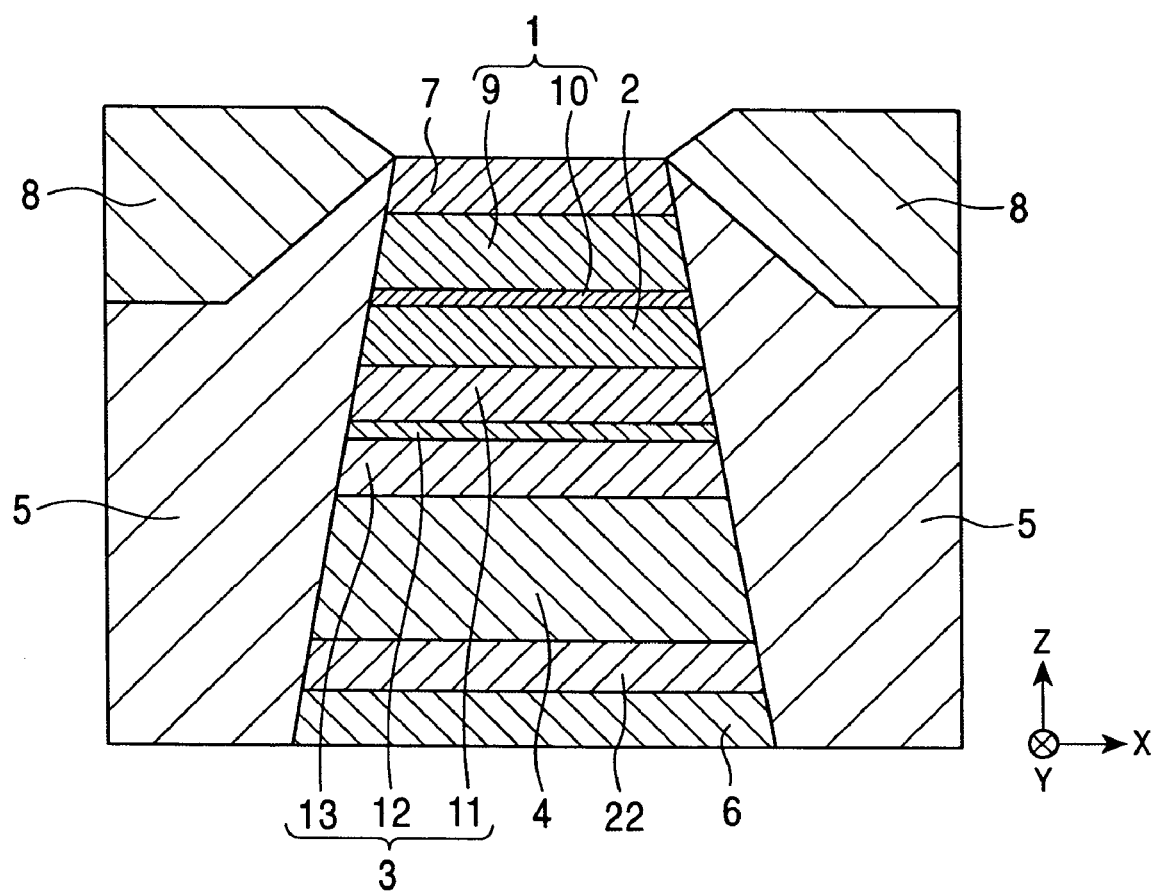
FIG. 1 is a cross-section illustrating the structure of a single spin-valve magnetoresistive element according to a first embodiment of the present invention as viewed from an air bearing surface side.

FIG. 1 is a cross-sectional view of a structure of a single spin-valve magnetoresistive element according to a first embodiment of the present invention as viewed from the air bearing surface side. Only the central portion of the element extending in the X direction is cut and is shown in FIG. 1.

The single spin-valve thin-film magnetic element is typically disposed at the trailing end face of a floating slider provided in a hard disk device and detects the recorded magnetic field of a hard disk or the like. A magnetic recording medium, typically a hard disk, moves in the Z direction, and the direction of a leakage magnetic field from the magnetic recording medium is in the Y direction.

The bottom-most layer in FIG. 1 is an underlayer 6 composed of a nonmagnetic material including at least one element selected from the group consisting of Ta, Hf, Nb, Zr, Ti, Mo, and W. A seed layer 22 is provided on the underlayer 6. The underlayer 6 is provided to preferentially align one of the crystallographically identical planes generically described as {111} planes of the seed layer 22 in a direction parallel to the layer surface. The underlayer 6 has a thickness of, for example, approximately 50 angstroms.

In the seed layer 22 which is mainly composed of face centered cubic crystals, one of the crystallographically identical crystal planes generically described as the {111} planes are preferentially aligned parallel to the interface with the antiferromagnetic layer 4. The seed layer 22 preferably comprises a NiFe alloy or a Ni—Fe—Y alloy wherein Y is at least one element selected from the group consisting of Cr, Rh, Ta, Hf, Nb, Zr, and Ti.

Herein, "crystallographically identical planes" refers to certain crystal lattice planes described in terms of Miller indices. The crystallographically identical planes described as the (111) planes include the (111) plane, the (–111) plane, the (1-11) plane, the (11-1) plane, the (–1-11) plane, the (1-1-1) plane, the (–11-1) plane, and the (–1-1-1) plane.

In the first embodiment, the (111) plane, the (1-11) plane, or one of the other crystallographically identical planes is preferentially aligned parallel to the layer surface.

Preferably, the seed layer 22 is nonmagnetic at room temperature. When the seed layer 22 is nonmagnetic at room temperature, degradation in asymmetry of waveforms can be prevented, the specific resistance of the seed layer 22 can be increased as a result of adding element Y (described later) for making the seed layer nonmagnetic, and it becomes possible to inhibit a sense current supplied from a conductive layer to flow into the seed layer 22. When the sense current easily flows into the seed layer 22, the rate of change in specific resistance (ΔR/R) is reduced and Barkhausen noise is generated.

In order to form the nonmagnetic seed layer 22, the above-described Ni—Fe—Y alloy, wherein Y is at least one selected from the group consisting of Cr, Rh, Ta, Hf, Nb, Zr, and Ti, may be selected. This material is preferable because the material has a face-centered cubic structure and one of the crystallographically identical planes described as the {111} planes can easily be preferentially aligned parallel to the layer surface. The seed layer 22 has a thickness of, for example, approximately 30 angstroms.

An antiferromagnetic layer 4 is formed on the seed layer 22. The antiferromagnetic layer 4 preferably includes an antiferromagnetic material containing manganese (Mn) and element X wherein X is at least one element selected from the group consisting of Pt, Pd, Ir, Rh, Ru, and Os.

The X—Mn alloy containing at least one platinum group element has a number of excellent characteristics as an antiferromagnetic material, such as superior corrosion resistance and a high blocking temperature. The alloy is also capable of generating a strong exchange coupling magnetic field (Hex). It is especially preferable to use platinum (Pt) among the platinum group elements. A binary alloy, for example, a PtMn alloy, may be used.

Alternatively, the antiferromagnetic layer 4 may be made of an antiferromagnetic material containing element X, element X', and Mn, wherein the element X' is at least one element selected from the group consisting of Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Sn, Hf, Ta, W, Re, Au, Pb, and rare earth elements.

Preferably, a type of element capable of entering into interstices in the lattice formed by X and Mn and making an interstitial solid solution or a type of element capable of displacing some of the lattice points in the crystal lattice formed by X and Mn and making a substitutional solid solution is used as the element X'. Herein, "solid solution" refers to a solid in which components thereof are homogeneously mixed within a single crystal phase.

By making the material into an interstitial solid solution or substitutional solid solution, the lattice constant of the X—Mn—X' alloy can be increased compared to the lattice constant of the above-described X—Mn alloy, thereby increasing the difference between the lattice constant of the antiferromagnetic layer 4 and that of a pinned magnetic layer 3, as described below. As a consequence, the structure of the interface between the antiferromagnetic layer 4 and the pinned magnetic layer 3 can readily enter a lattice-mismatching state. When the element X' is the type of element which forms a substitutional solid solution, characteristics as an antiferromagnetic material are degraded if the content X' is excessively high, thus weakening the exchange coupling magnetic field generated at the interface with the pinned magnetic layer 3. In this embodiment, it is preferable to use an inert rare gas element, namely, at least one element selected from the group consisting of Ne, Ar, Kr, and Xe, capable of forming an interstitial solid solution, as the element X'. Since the rare gas elements are inert gasses, the antiferromagnetic characteristics will not be affected even when the rare gas elements are contained in the layers. Moreover, gasses such as Ar have been conventionally used as the sputtering gasses inside sputtering apparatuses and can easily be incorporated into the layer by merely optimizing the gas pressure.

It should be noted that when gaseous elements are used as the element X', it is difficult to form the layers containing a large amount of X'. A trace amount of a rare gas in the layers will yield a drastically increased exchange coupling magnetic field.

In the this embodiment, the content of the above-described element X' is preferably in the range of 0.2 to 10 atomic percent and more preferably in the range of 0.5 to 5 atomic percent. Preferably, the element X is platinum (Pt) and the Pt—Mn—X' alloy is used.

Next, the pinned magnetic layer 3 composed of three layers is formed on the antiferromagnetic layer 4'.

The pinned magnetic layer 3 is composed of a Co layer 11, a Ru layer 12, and a Co layer 13. The magnetization vectors of the Co layer 11 and the Co layer 13 are antiparallel to each other due to the exchange coupling magnetic field at the interface with the antiferromagnetic layer 4. This antiparallel state is a so-called "ferri-magnetic coupling state". By employing such a structure, the magnetization of the pinned magnetic layer 3 can be stabilized and the exchange coupling magnetic field generated at the interface between the pinned magnetic layer 3 and the antiferromagnetic layer 4 can be increased.

The thickness of the Co layer 11 is, for example, approximately 20 angstroms. The thickness of the Ru layer 12 is, for example, approximately 8 angstroms. The thickness of the Co layer 13 is, for example, approximately 15 angstroms.

It should be noted that the pinned magnetic layer 3 need not be composed of three layers but can be, for example, a single layer. The layers 11, 12, and 13 may be formed of materials other than the above-described magnetic materials.

A nonmagnetic interlayer 2 is formed on the pinned magnetic layer 3. The nonmagnetic interlayer 2 is composed of, for example, copper (Cu). An insulative material such as $Al_2O_3$ is used if the magnetoresistive element of the this embodiment is a tunnel magnetoresistive element (TMR element) utilizing the tunnel effect.

A free magnetic layer 1 comprising two layers is provided on the nonmagnetic interlayer 2.

The free magnetic layer 1 is formed of two layers, namely, a NiFe alloy layer 9 and a Co layer 10. As shown in FIG. 1, the Co layer 10 is located at the side contacting the nonmagnetic interlayer 2 so as to prevent the diffusion of metal elements or the like at the interface with the nonmagnetic interlayer 2 and to increase the rate of change in resistance ($\Delta R/R$).

The NiFe alloy layer 9 contains, for example, 80 atomic percent Ni and 20 atomic percent Fe. The thickness of the NiFe alloy layer 9 is, for example, approximately 45 angstroms and the thickness of the Co layer 10 is approximately 5 angstroms.

As shown in FIG. 1, a protective layer 7 comprising a nonmagnetic material comprising at least one element selected from the group consisting of Ta, Hf, Nb, Zr, Ti, Mo, and W is formed on the free magnetic layer 1.

Hard bias layers 5 and conductive layers 8 are formed on two sides of the stacked layers from the underlayer 6 to the protective layer 7. The bias magnetic field from the hard bias layers 5 orients the magnetization vector of the free magnetic layer 1 in the track width direction (the X direction in the drawing).

The hard bias layers 5 comprise, for example, a cobalt-platinum (Co—Pt) alloy, a cobalt-chromium-platinum (Co—Cr—Pt) alloy, or the like. The conductive layers 8 comprise, for example, α-Ta, Au, Cr, Cu, W, or the like. In the above-described tunnel magnetoresistive element, one of the conductive layers 8 is provided below the free magnetic layer 1 and the other above the antiferromagnetic layer 4.

In this embodiment, a back layer comprising a metal material or nonmagnetic metal Cu, Au, or Ag may be formed on the free magnetic layer 1. In such a case, the thickness of the back layer is, for example, approximately 12 to 20 angstroms.

Preferably, the protective layer 7 comprises tantalum (Ta) or the like. Preferably, the protective layer 7 has an oxidized surface forming an oxide layer.

When the back layer is provided, the mean free path of the up-spin electrons contributing to the generation of the magnetoresistive effect is extended, and by the so-called spin filter effect, the resulting spin-valve magnetic element exhibits an increased rate of change in resistance and is thereby capable of reading a high-recording-density medium.

After the above-described layers are deposited, the layers are heat-treated in order to generate an exchange coupling magnetic field (Hex) at the interface between the antiferromagnetic layer 4 and the pinned magnetic layer 3, and to pin the magnetization vector of the pinned magnetic layer 3 in the height direction (the Y direction in the drawing) by the thus-generated magnetic field. The crystal orientation of the resulting spin-valve thin-film element is as described below.

The crystal orientation will be described below in connection with the exchanged coupling film mainly composed of the antiferromagnetic layer and the ferromagnetic layer (pinned magnetic layer).

In this embodiment, as described above, the seed layer 22 is provided under the antiferromagnetic layer 4. The seed layer 22 is formed in such a manner that one of the crystallographically identical planes generically described as {111} planes is preferentially aligned in the layer surface. In this manner, the same crystallographically identical plane of the antiferromagnetic layer 4 deposited on the seed layer 22 will be preferentially aligned parallel to the layer surface.

For example, when the seed layer 22 has the (−111) plane preferentially aligned parallel to the layer surface, the (−111) plane of the antiferromagnetic layer 4 is also preferentially aligned parallel to the layer surface.

Moreover, in the pinned magnetic layer 3 deposited on the antiferromagnetic layer 4, the same crystal plane as the antiferromagnetic layer 4 is preferentially aligned parallel to the layer surface.

Accordingly, in the seed layer 22, the pinned magnetic layer 3, and the antiferromagnetic layer 4 of this embodiment, one of the crystallographically identical planes generically described as {111} is preferentially aligned parallel to the layer surface.

It should be noted that in this embodiment, it is preferable that the crystal plane being preferentially aligned in a direction parallel to the layer surface be one of the crystallographically identical planes described as the {111} planes since these crystal planes are the closest packed planes. Thermal stability required to withstand increases in ambient temperature inside the magnetic head device and increases in the sense current density can be improved when one of the crystallographically identical planes described as the {111} planes, i.e., the closest packed planes, is aligned in a direction parallel to the layer surface because, in this manner, the diffusion of atoms in the layer thickness direction is reduced, the thermal stability of the interface between these layers is improved, and reliable operation can be achieved.

Figure 14:
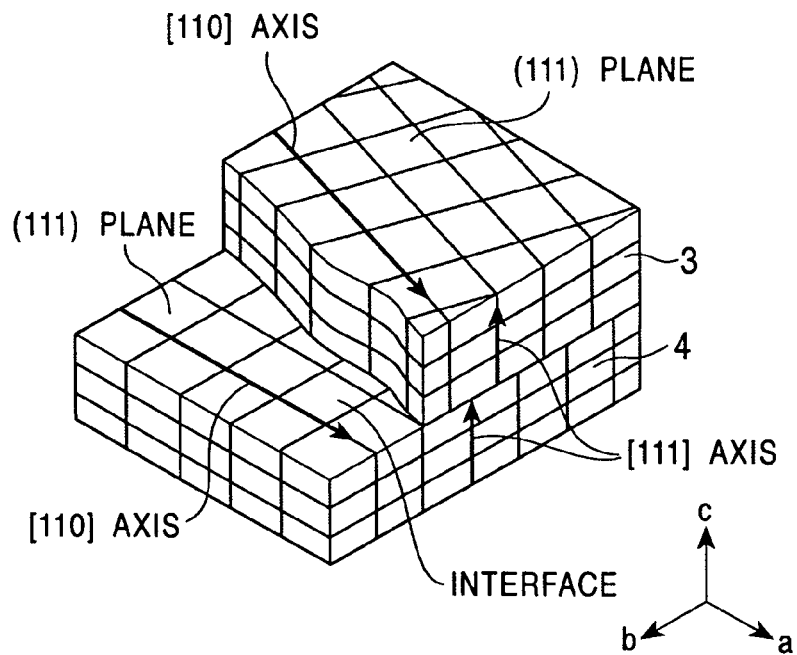
FIG. 14 illustrates the crystal orientation of the antiferromagnetic layer and the crystal orientation of the ferromagnetic layer in the exchange coupling film of the present invention.

While the same crystal planes are preferentially aligned parallel to the layer surface in the antiferromagnetic layer 4 and the pinned magnetic layer 3, a particular crystal axis lying in the crystal plane of each layer is oriented in a different direction between the antiferromagnetic layer 4 and the pinned magnetic layer 3, at least partly (see FIG. 14). For example, referring to FIG. 14, the [110] axes in the (111) plane of the antiferromagnetic layer 4 and the pinned magnetic layer 3 are oriented in different directions.

FIG. 14 is a partial isometric view illustrating the crystal orientations of the antiferromagnetic layer and the ferromagnetic layer constituting the exchange coupling film of this embodiment.

FIG. 14 illustrates the crystal orientations of the antiferromagnetic layer 4 comprising an antiferromagnetic material containing X and Mn, wherein X is at least one element selected from the group consisting of Pt, Pd, Ir, Rh, Ru, and OS, and the pinned magnetic layer (ferromagnetic layer) 3 comprising, for example, a NiFe-type alloy or the like.

Referring to FIG. 14, the (111) plane of the antiferromagnetic layer 4 is preferentially aligned parallel to the interface with the ferromagnetic layer 3. The (111) plane of the ferromagnetic layer 3 is also preferentially aligned parallel to the interface with the antiferromagnetic layer 4.

As shown in FIG. 14, the crystal axes running in a direction perpendicular to the (111) crystal plane (the c direction in the drawing) are the [111] axes. As described above, since both the (111) planes of the antiferromagnetic layer 4 and the ferromagnetic layer 3 are preferentially aligned in parallel to the interface, the [111] axis of the antiferromagnetic layer 4 and the [111] axis of the ferromagnetic layer 3 are oriented in the same direction.

It should be noted here that the [111] axis described above or the [110] axis described below refers to the crystal axis of the above-described crystal plane. Equivalent axes of the [111] axis include the [−111] axis, [11-1] axis, the [1-11] axis, the [−1-11] axis, the [1-1-1] axis, the [−11-1] axis, and the [−1-1-1] axis. Equivalent axes of the [110] axis include [−110] axis, the [1-10] axis, the [−1-10] axis, the [−10-1] axis, the [101] axis, the [−101] axis, the [10-1]axis, the [011] axis, the [01-1] axis, the [0-11] axis, and the [0-1-1] axis. When one of these crystallographically equivalent axes are referred to, the generic notation such as <111> axes or <110> axes will be used.

In FIG. 14, the [110] axis lying in the (111) plane of the antiferromagnetic layer 4 is oriented in the a direction in the drawing.

In contrast, the [110] axis lying in the (111) plane of the ferromagnetic layer 3 is not oriented in the a direction but is shifted from the a direction toward the b direction in the drawing. As apparent from the drawing, the [110] axis of the antiferromagnetic layer 4 and the [110] axis of the ferromagnetic layer 3 are oriented in different directions.

When the layers have such crystal orientations, the arrangement of the atoms constituting the antiferromagnetic layer 4 and the arrangement of the atoms constituting the ferromagnetic layer 3 are prevented from exhibiting a one-to-one correspondence at the interface.

When such crystal orientations are achieved, the antiferromagnetic layer 4 will properly transform into an ordered lattice as a result of heat treatment without being restrained by the crystal structure of the ferromagnetic layer 3, thereby generating an increased exchange coupling magnetic field.

The development of such crystal orientations are considered to depend on the conditions at which the pinned magnetic layer 3 and the antiferromagnetic layer 4 are deposited prior to a heating step.

For example, when components of the antiferromagnetic layer 4 and the ratio of the components therein are optimized so that the lattice constants of the antiferromagnetic layer 4 are sufficiently larger than the lattice constants of the pinned magnetic layer 3, the layers barely achieve epitaxial growth.

Figure 15:
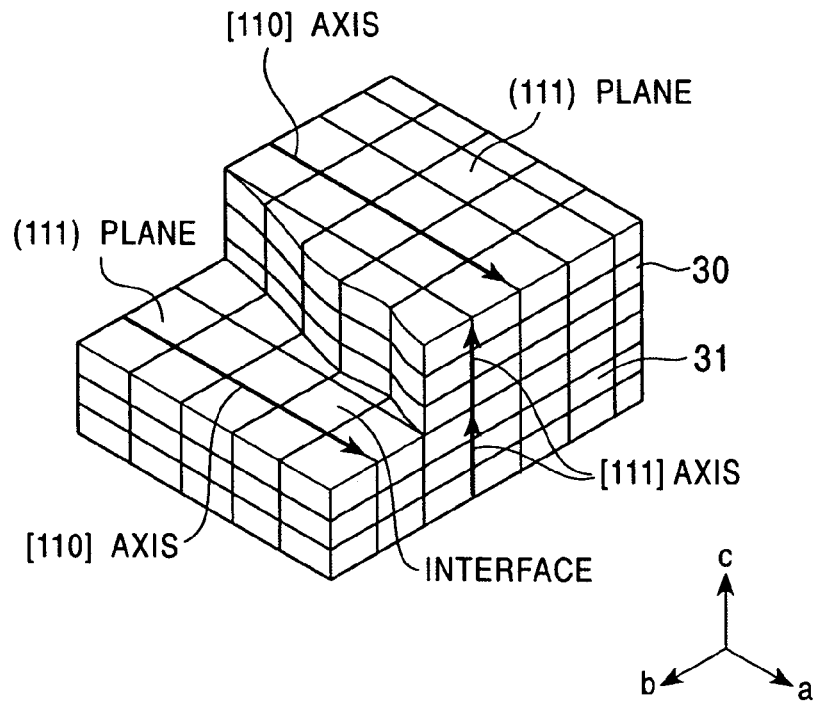
FIG. 15 illustrates the crystal orientation of the antiferromagnetic layer and the crystal orientation of the ferromagnetic layer in the exchange coupling film for comparison.

If the antiferromagnetic layer 4 and the pinned magnetic layer 3 are epitaxially grown, the resulting antiferromagnetic layer 4 and the pinned magnetic layer 3 are likely to have every crystal orientation parallel to each other. Not only are the same crystal planes of the antiferromagnetic layer 4 and the pinned magnetic layer 3 preferentially aligned parallel to the interface, but also the above-described particular crystal axes in the crystal planes of the antiferromagnetic layer 4 and the pinned magnetic layer 3 are oriented in the same direction. As a result, the atomic configuration of the antiferromagnetic layer 4 and that of the pinned magnetic layer 3 readily exhibit a one-to-one correspondence (see FIG. 15). FIG. 15 shows a specific example in which the [110] axis in the (111) plane of an antiferromagnetic layer 31 is oriented in the same direction as that of a ferromagnetic layer 30.

FIG. 15 is a partial isometric view illustrating the crystal orientations of the antiferromagnetic layer and the ferromagnetic layer (pinned magnetic layer) constituting an exchange coupling film (single-valve film) for comparison.

Reference numeral 31 denotes an antiferromagnetic layer comprising an antiferromagnetic material containing X and Mn, wherein X is at least one element selected from the group consisting Pt, Pd, Ir, Rh, Ru, and Os. Reference numeral 30 denotes a ferromagnetic layer comprising, for example, a NiFe-type alloy.

Referring to FIG. 15, the (111) planes of the antiferromagnetic layer 31 and the ferromagnetic layer 30 are preferentially aligned parallel to the layer surface as in the exchange coupling film shown in FIG. 14.

Because the (111) planes of the antiferromagnetic layer and the ferromagnetic layer are preferentially aligned parallel to the layer surface, the [111] axes lying in the (111) planes are oriented in the same direction, namely, the c direction in the drawing.

Moreover, in this exchange coupling film for comparison, the [110] axes among the crystal axes in the above-described (111) planes of the antiferromagnetic layer 31 and the ferromagnetic layer 30 are oriented in the same direction, namely, the a direction in the drawing.

Such crystal orientations readily develop in the exchange coupling film when the antiferromagnetic layer 31 and the ferromagnetic layer 30 are epitaxially grown during their deposition step. When the layers are epitaxially deposited, not only the same crystal plane is preferentially oriented parallel to the layer surface in the antiferromagnetic layer 31 and the ferromagnetic layer 30, but also other crystal planes not parallel to the layer surface readily enter a parallel relationship between the antiferromagnetic layer 31 and the ferromagnetic layer 30.

Such crystal orientations lead to the development of a one-to-one correspondence of the atoms constituting the antiferromagnetic layer 31 and the ferromagnetic layer 30 at the interface of these layers. As a consequence, when such crystal orientations are developed, the antiferromagnetic layer 31 is restrained by the crystal structure of the ferromagnetic layer 30 and will not achieve a proper order transformation, resulting in a reduced exchange coupling magnetic field.

If the antiferromagnetic layer 4 and the pinned magnetic layer 3 have such crystal orientations, as shown in FIG. 15, before heat treatment, the crystal structure of the antiferromagnetic layer 4 is restrained by the crystal structure of the pinned magnetic layer 3 during heating, the antiferromagnetic layer 4 cannot achieve a proper order transformation, and the exchange coupling magnetic field is significantly reduced.

In this embodiment, the antiferromagnetic layer 4 and the pinned magnetic layer 3 are not epitaxially deposited. Consequently, the resulting antiferromagnetic layer 4 will not be restrained by the crystal structure of the pinned magnetic layer 3 and will achieve a proper order transformation once the deposited layers are heated. Observations of the layer structure of the spin-valve film of the present invention show that although the same crystallographically identical plane is preferentially aligned parallel to the layer surface in the antiferromagnetic layer 4 and the pinned magnetic layer 3, other crystal planes of the antiferromagnetic layer 4 not parallel to the layer surface are not aligned parallel to those of the pinned magnetic layer 3. As a result, a particular crystal axis in the crystal plane of the antiferromagnetic layer 4 is oriented in a direction different from that of the pinned magnetic layer 3, at least partly.

In this embodiment, the seed layer 22 is provided under the antiferromagnetic layer 4 as a means for yielding the above-described crystal orientation. As described earlier, by providing the seed layer 22, the crystal planes of the upper gap layer antiferromagnetic layer 4 and the pinned magnetic layer 3 preferentially aligned parallel to the layer surface are crystallographically identical. Such a crystal alignment will yield high rates of change in resistance ($\Delta R/R$).

Also, in this embodiment, a particular crystal axis lying in the above-described crystal plane of the antiferromagnetic layer 4, the crystal plane being aligned parallel to the layer surface, and the same crystal axis of the pinned magnetic layer 3 are oriented in directions different from each other. Such crystal orientations are considered to have been developed by a proper transformation from a disordered-phase face-centered cubic lattice to an ordered-phase Cu—Au—I-type face centered cubic lattice at the antiferromagnetic layer 4 which is not restrained by the crystal structure of the pinned magnetic layer 3 during heating. As a result, a strong exchange coupling magnetic field can be obtained. Note that in this embodiment, not all, but only part of the crystals of the antiferromagnetic layer 4 need to have the CuAu—I-type ordered face-centered cubic lattice after the heat treatment.

Whether or not the above-described crystal orientations are achieved can be determined by the observation of the cross-sections obtained by cutting the pinned magnetic layer 3 and the antiferromagnetic layer 4 in the layer thickness direction (the Z direction in the drawing).

In this embodiment, the crystal grain boundaries of the antiferromagnetic layer 4 and the pinned magnetic layer 3 as observed in the above-described cross-section are discontinuous, at least partially, at the interface between the pinned magnetic layer 3 and the antiferromagnetic layer 4.

Figure 26:
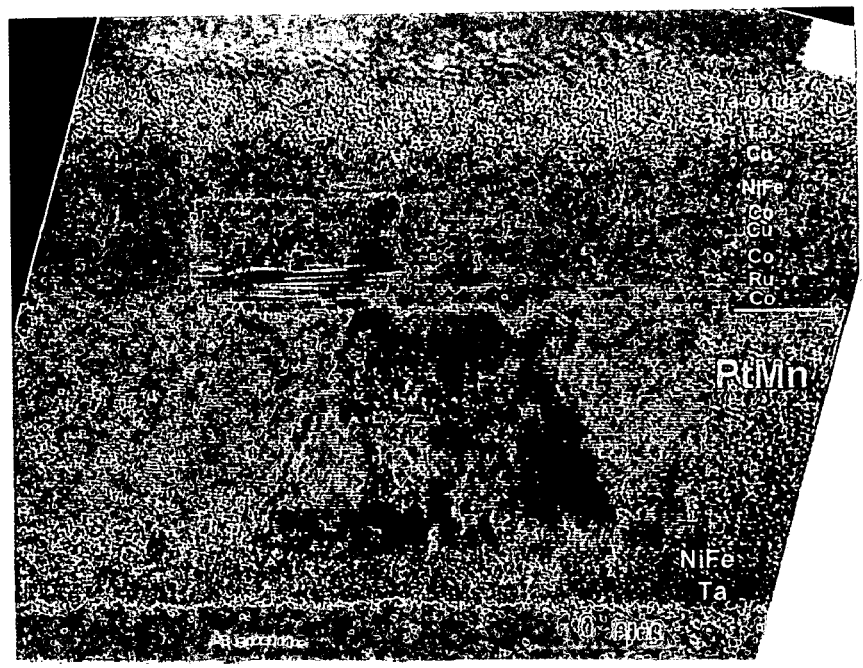
FIG. 26 is a transmission electron beam micrograph of a cross-section of the spin-valve thin-film element of the present invention parallel to the layer thickness direction.
Figure 28:
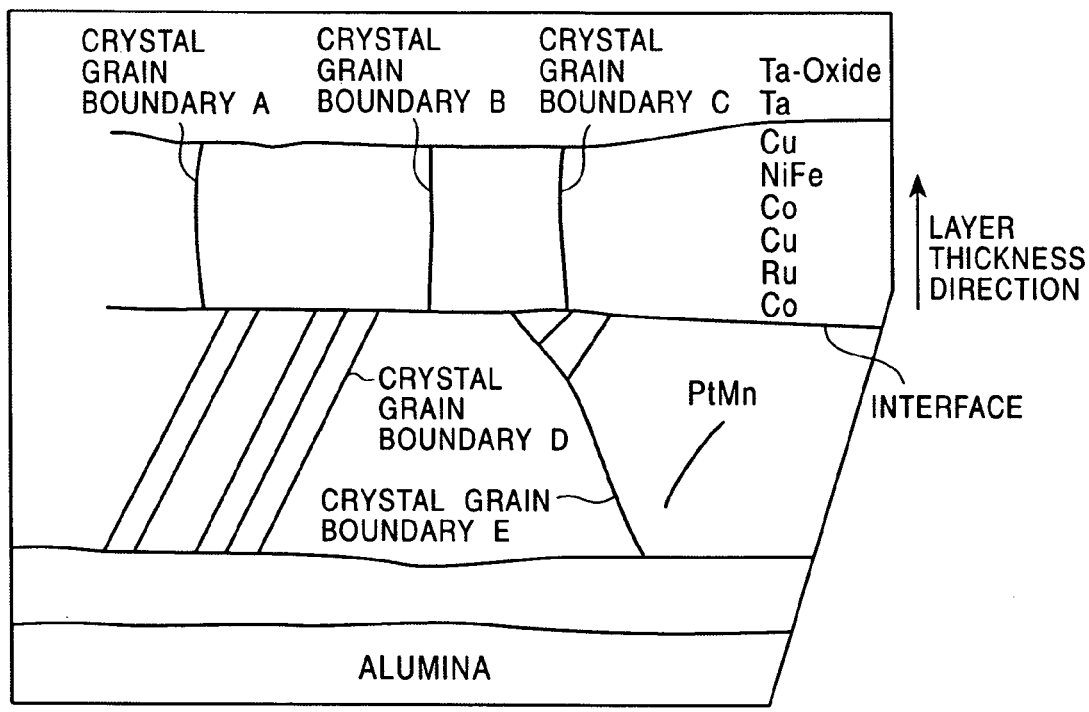
FIG. 28 is an illustration of a portion of the transmission electron beam micrograph shown in FIG. 26.

FIG. 26 is a transmission electron microscopy photograph (TEM photograph) and FIG. 28 is an illustration of the photograph in FIG. 26. As shown in FIGS. 26 and 28, the crystal grain boundaries D and E formed in the PtMn alloy layer (antiferromagnetic layer 4) and the crystal grain boundaries A, B, and C formed above the antiferromagnetic layer are discontinuous at the interface. When there is such a discontinuity, it can be assumed that the same particular crystal axis lying in the crystal plane of the antiferromagnetic layer 4 parallel to the layer surface is oriented in a direction different from that of the pinned magnetic layer 3, at least partly.

Figure 27:
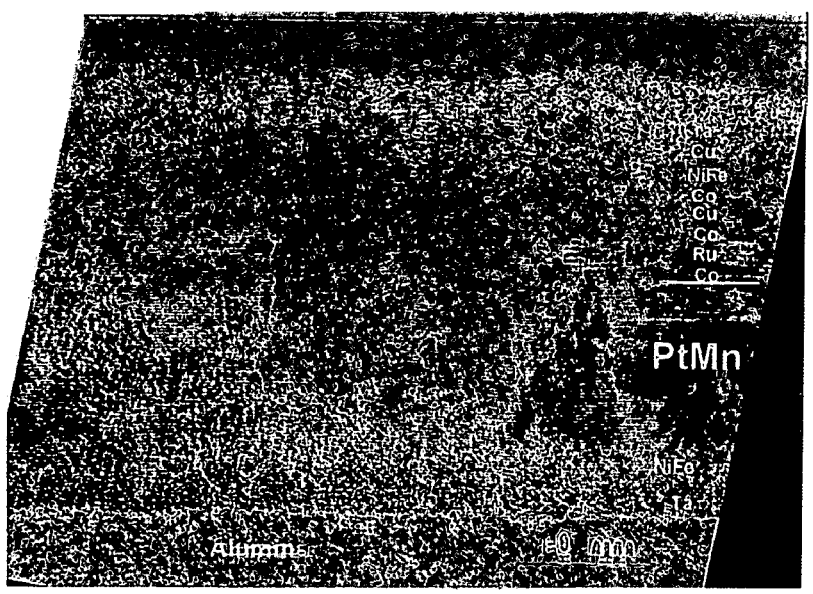
FIG. 27 is a transmission electron beam micrograph of a cross section of the spin-valve thin-film element for comparison parallel to the layer thickness direction.
Figure 29:
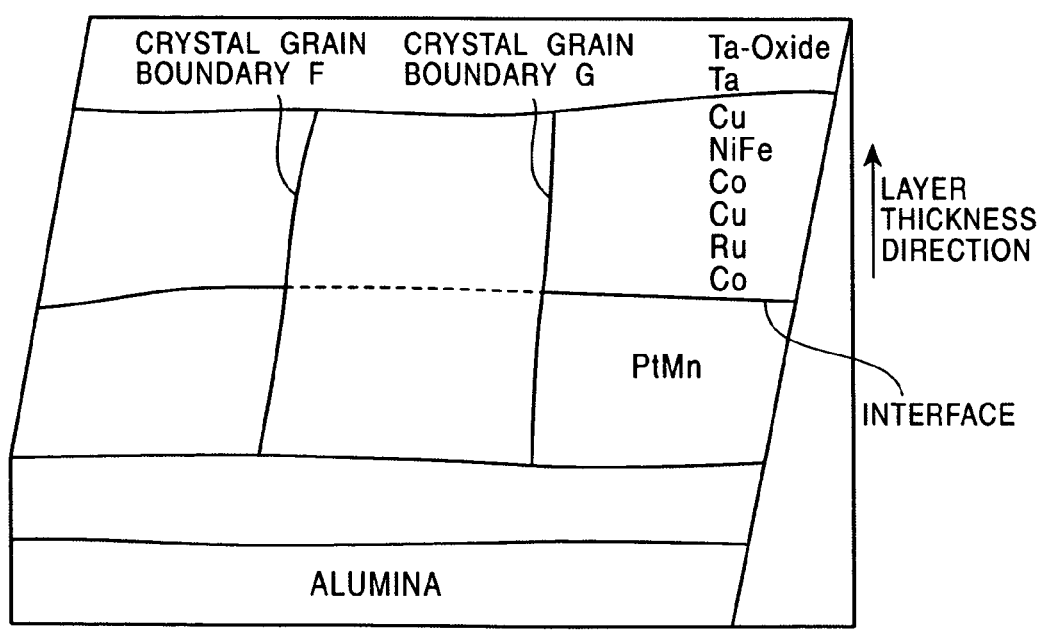
FIG. 29 is an illustration of a portion of the transmission electron beam micrograph shown in FIG. 27.

The crystal structure shown in FIGS. 26 and 28 is clearly different from the crystal structure of the deposited layer shown for comparison in FIGS. 27 and 29 (FIG. 27 is a transmission electron microscopy photograph (TEM photograph) and FIG. 29 is an illustration of the photograph in FIG. 27). In FIGS. 27 and 29, the crystal grain boundaries formed in the PtMn alloy layer (antiferromagnetic layer 4) and the crystal grain boundaries formed in the layer above the PtMn alloy layer are continuous since a significantly large crystal grain extending over the interfaces between these layers is formed across the antiferromagnetic layer 4 and the layer provided on the antiferromagnetic layer 4.

When the exchange coupling film has the crystal grain boundaries of this invention as shown in FIGS. 26 and 28, it is considered that the antiferromagnetic layer 4 and the pinned magnetic layer 3 are not deposited epitaxially during the deposition process. As a result, a proper order transformation is performed in the antiferromagnetic layer 4 without being restrained by the crystal structure of the pinned magnetic layer 3, thereby generating an increased exchange coupling magnetic field.

In this embodiment, after the antiferromagnetic layer 4 and the pinned magnetic layer 3 are deposited and heated, the crystal orientations thereof are subjected to a transmission electron beam diffraction analysis. If the diffraction diagrams obtained show the profiles described below, it can be assumed that the crystal planes preferentially aligned parallel to the interfaces between the antiferromagnetic layer 4 and the pinned magnetic layer 3 are crystallographically identical and that a particular crystal axis of the antiferromagnetic layer 4 in the above crystal plane is oriented in a direction different from that of the pinned magnetic layer 3, at least partly.

First, an electron beam enters parallel to the interface between the pinned magnetic layer 3 and the antiferromagnetic layer 4. A transmission electron beam diffraction diagram is obtained for each of the antiferromagnetic layer 4 and the pinned magnetic layer 3.

In the transmission electron beam diffraction diagrams of the antiferromagnetic layer 4 and the pinned magnetic layer 3, diffraction spots corresponding to the reciprocal lattice points assigned to respective crystal planes of the respective layers appear. These reciprocal lattice points (diffraction spots) indicate crystal planes described in terms of Miller indices. For example, the reciprocal lattice point is the (110) plane.

Next, each of the diffraction spots is labeled. The range r from the beam origin to the diffraction spot is inversely proportional to the lattice interplanar distance d, and d can be obtained by measuring r. Since the interplanar distance of the crystal lattice planes {hkl} of PtMn, CoFe, NiFe, and the like are resolved to a certain extent, the diffraction spots thereof can be labeled as {hkl} accordingly. Moreover, standard references concerning transmission electron beam diffraction analysis list transmission electron beam diffraction diagrams obtained by examining (or calculating) crystal grains of single crystal structures from various crystal orientations. In each of the diffraction diagrams, diffraction spots are labeled as {hkl}. By using these references, the resemblance between each of the diffraction spots in the diffraction diagrams of the antiferromagnetic layer 4 and the pinned magnetic layer 3, and the diffraction spot of a particular crystal plane in a particular single crystal structure is identified, and each of the diffraction spots is labeled accordingly.

The transmission electron beam diffraction diagram of the antiferromagnetic layer 4 and that of the pinned magnetic layer 3 are superimposed on each other while aligning the beam origin of the diffraction diagram of the antiferromagnetic layer 4 with that of the pinned magnetic layer 3.

Alternatively, the antiferromagnetic layer 4 and the pinned magnetic layer 3 may be simultaneously irradiated by the electron beam, and a transmission electron beam diffraction diagram may be obtained within the scope of such irradiation.

Figure 16:
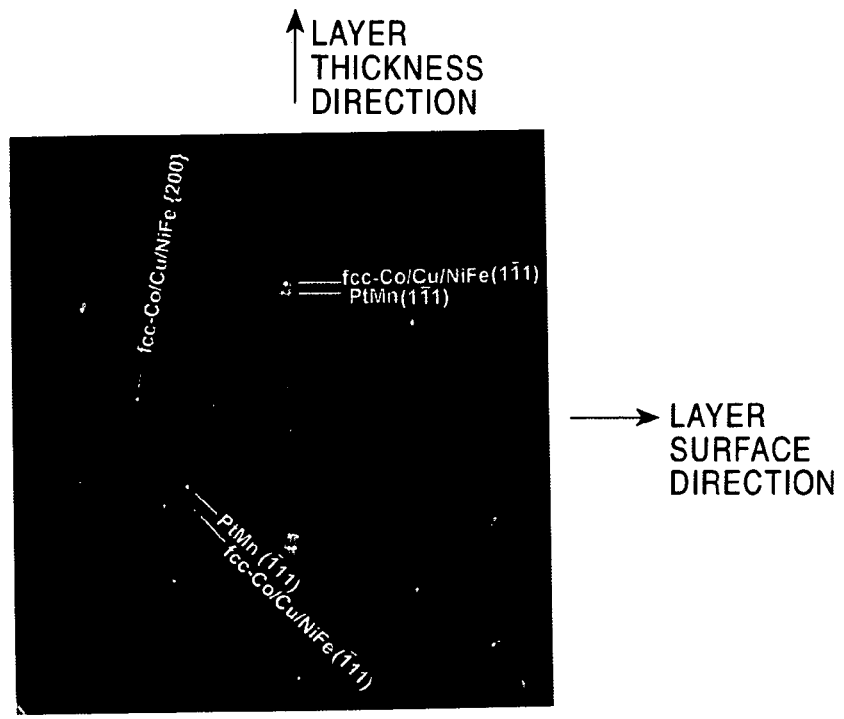
FIG. 16 is a transmission electron beam diffraction diagram in a direction parallel to the layer surface of a spin valve film of the present invention.
Figure 18:
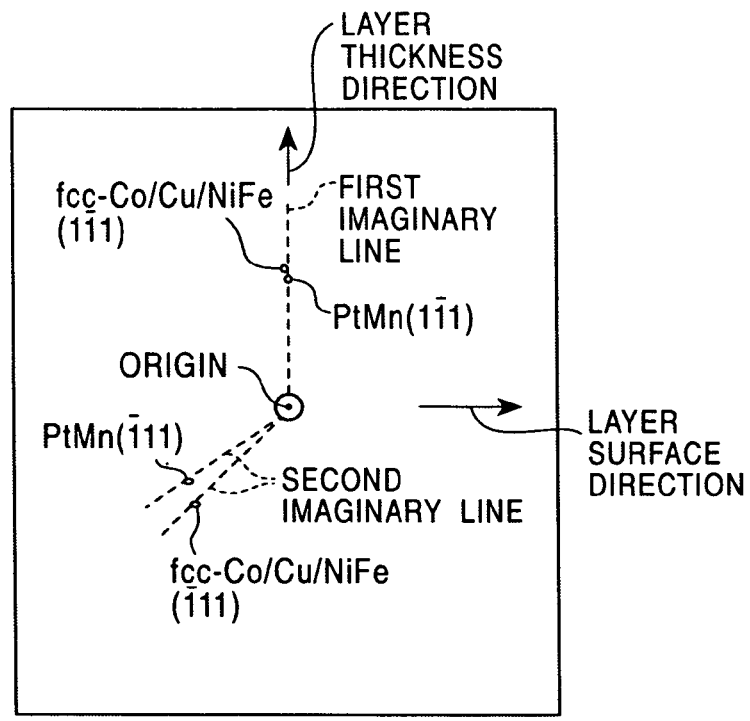
FIG. 18 illustrates a portion of the transmission electron beam diffraction diagram in FIG. 16.

In each of the diffraction diagrams of the pinned magnetic layer 3 and the antiferromagnetic layer 4, a particular diffraction spot which is located in the thickness direction in relation to the beam origin and which is given the same label in both the diffraction diagrams of the antiferromagnetic layer 4 and the pinned magnetic layer 3 is selected. A first imaginary line is drawn connecting this diffraction spot and the beam origin. As shown in FIGS. 16 and 18 (FIG. 16 is a transmission electron beam diffraction diagram and FIG. 18 is an illustration of the diagram shown in FIG. 16), the first imaginary line in the diffraction diagram of the pinned magnetic layer 3 and that of the antiferromagnetic layer 4 coincide with each other, indicating the crystal planes of the antiferromagnetic layer 4 and the pinned magnetic layer 3 preferentially aligned parallel to the layer surface are crystallographically identical.

Next, in each of the diffraction diagrams of the pinned magnetic layer 3 and the antiferromagnetic layer 4, a particular diffraction spot which is located in a direction other than the above-described layer thickness direction in relation to the beam origin and which is given the same label in the diffraction diagrams of the pinned magnetic layer 3 and the antiferromagnetic layer 4 is selected. A second imaginary line is drawn connecting this diffraction spot and the beam origin. As shown in FIGS. 16 and 18, the second imaginary line in the diffraction diagram of the antiferromagnetic layer 4 and the second imaginary line in the diffraction diagram of the pinned magnetic layer 3 are not coincident, indicating the crystal planes of the antiferromagnetic layer 4, which are not aligned parallel to the layer surface, are not parallel to the corresponding crystal planes of the pinned magnetic layer 3. Another instance where the crystal planes aligned in a direction other than the layer surface direction are not parallel with each other between the pinned magnetic layer 3 and the antiferromagnetic layer 4 is when a particular diffraction spot indicative of a particular crystal plane, located in a direction other than the layer thickness direction, appears only in one of the diffraction diagrams.

Figure 17:
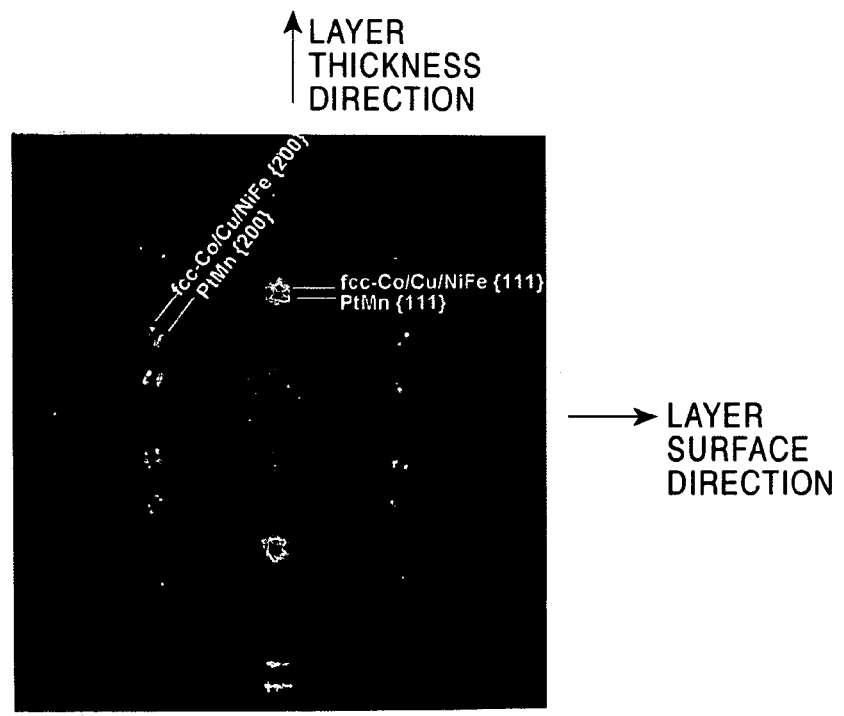
FIG. 17 is a transmission electron beam diffraction diagram in a direction parallel to the layer surface of a spin valve film for comparison.
Figure 19:
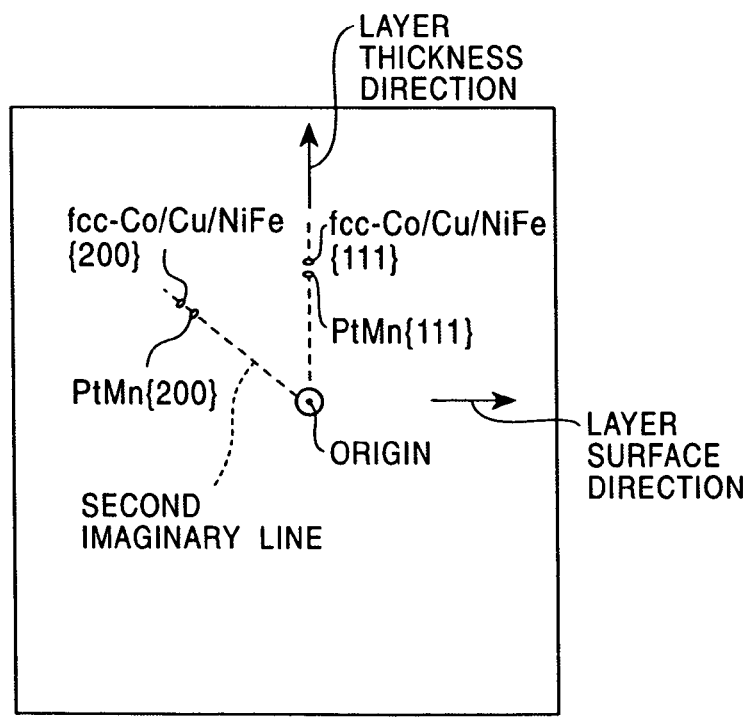
FIG. 19 illustrates a portion of the transmission electron beam diffraction diagram in FIG. 17.

The diffraction diagrams obtained from the spin-valve film of the this embodiment and the diffraction diagrams obtained for comparison from a conventional spin-valve film are clearly different as can be understood from FIGS. 17 and 19 (FIG. 17 is a transmission electron beam diffraction image and FIG. 19 is an illustration of the diffraction image of FIG. 19). In the comparison spin-valve film, as shown in FIGS. 17 and 19, the second imaginary line in the diffraction diagram of the antiferromagnetic layer 4 drawn as above and that of the pinned magnetic layer 3 are coincident with each other.

When a transmission electron beam diffraction image as in FIG. 16 is obtained, it can be assumed that the crystal planes of the antiferromagnetic layer 4 and the pinned magnetic layer 3 aligned parallel to the layer surface are crystallographically identical and that crystallographically identical axes lying in the crystal planes of the antiferromagnetic layer 4 and the pinned magnetic layer 3 are oriented in different directions.

The diffraction diagrams of the antiferromagnetic layer and the ferromagnetic layer will be explained in detail with reference to FIGS. 16 to 19.

FIGS. 16 and 17 are transmission electron beam diffraction diagrams obtained using an electron beam in a direction perpendicular to a cross-section of the deposited layers (spin-valve film) cut parallel to the layer thickness direction. The transmission electron beam diffraction diagrams shown in FIG. 16 is obtained using an electron beam having an aperture capable of irradiating both the antiferromagnetic layer and the layer other than the antiferromagnetic layer.

FIG. 18 is an illustration of the transmission electron beam diffraction diagram shown in FIG. 16. FIG. 19 is an illustration of the transmission electron beam diffraction diagram shown in FIG. 17.

FIG. 16 is a transmission electron beam diffraction diagram obtained from the spin-valve film of this embodiment. The spin valve layer comprises: an $Al_2O_3$ layer 3 nm in thickness; a Ta layer 3 nm in thickness; a $Ni_{80}Fe_{20}$ seed layer 2 nm in thickness; a $Pt_{54}Mn_{46}$ antiferromagnetic layer 15 nm in thickness; a pinned magnetic layer composed of a Co layer 1.5 nm in thickness, a Ru layer 0.8 nm in thickness, and a Co layer 2.5 nm in thickness; a Cu nonmagnetic interlayer 2.5 nm in thickness; a free magnetic layer composed of a Co layer 1 nm in thickness and a $Ni_{80}Fe_{20}$ layer 3 nm in thickness; a Cu back layer 1.5 nm in thickness; a Ta protective layer 1.5 nm in thickness; and a Ta oxide layer.

FIG. 17 is an transmission electron beam diffraction diagram obtained for comparison from a conventional spin-valve film. The spin valve layer comprises: an $Al_2O_3$ layer 3 nm in thickness; a Ta layer 3 nm in thickness; a $Ni_{80}Fe_{20}$ seed layer 2 nm in thickness; a $Pt_{44}Mn_{56}$ antiferromagnetic layer 13 nm in thickness; a pinned magnetic layer composed of a Co layer 1.5 nm in thickness, a Ru layer 0.8 nm in thickness, and a Co layer 2.5 nm in thickness; a Cu nonmagnetic interlayer 2.5 nm in thickness; a free magnetic layer composed of a Co layer 1 nm in thickness and a $Ni_{80}Fe_{20}$ layer 3 nm in thickness; a Cu back layer 1.5 nm in thickness; a Ta protective layer 1.5 nm in thickness; and a Ta oxide layer.

Referring to FIG. 16, the diffraction spot indicating the {111} plane of PtMn and the diffraction spot indicating the {111} plane of fcc-Co/Cu/NiFe are located on the same line extending in the layer thickness direction. When these diffraction spots are specifically labeled, for example, (1-11) planes, the diffraction spots (-111) indicative of the crystal plane which is not parallel to the layer surface but forms 70.5 degrees angle with the (1-11) plane, are not on the same line extending from the center of the diffraction diagram. In other words, the crystal planes not parallel to the layer surface do not enter a parallel relationship between the PtMn layer and the pinned magnetic layer (ferromagnetic layer).

Referring to FIG. 17, the diffraction points indicative of {111} planes of PtMn and fcc-Co/Cu/NiFe (fcc-Co pinned magnetic layer is included) are on the same line extending in the layer thickness direction. Moreover, the diffraction points indicative of {200} planes are on the same line extending from the center of the diagram. The same can be observed for the diffraction spots other than the above-described diffraction spots. The diffraction diagrams of the PtMn and the fcc-Co/Cu/NiFe have every direction analogous. The reason that the diffraction diagram of PtMn is smaller than that of the fcc-Co/Cu/NiFe is that the lattice constant of PtMn is larger than that of the fcc-Co/Cu/NiFe by approximately 10 percent. PtMn and fcc-Co/Cu/NiFe exhibit perfect lattice matching, i.e., an epitaxial relationship.

It should be noted that in the diffraction diagram shown in FIG. 16, a bar (−) is placed on the figure "1" in the notation of the crystal planes described in terms of Miller indices. This represents −1 (minus one) and is described as "−1" throughout the specification.

Referring to FIG. 16, in the transmission electron beam diffraction diagram of this embodiment, a diffraction spot of the antiferromagnetic layer (PtMn) labeled as (1-11) appears in the layer thickness direction. The diffraction spot of layers other than the antiferromagnetic layer (indicated as "fcc-Co/Cu/NiFe" in the diffraction diagram) and labeled as (1-11) also appears in the layer thickness direction.

The above-described diffraction spots are illustrated in FIG. 18. As is apparent from FIG. 18, the first imaginary line connecting the diffraction spot labeled as the (1-11) plane in the diffraction diagram of the antiferromagnetic layer and the beam origin, and the first imaginary line connecting the diffraction spot labeled as the (1-11) plane in the diffraction diagram of the layer other than the antiferromagnetic layer are coincident with each other.

As shown in FIG. 16, a diffraction spot of the antiferromagnetic layer (PtMn layer) labeled as the (−111) plane and located in the a direction other than the layer thickness direction appears in the transmission electron beam diffraction diagram of this embodiment. In a direction other than the layer thickness direction, the diffraction spot labeled as the (−111) appears (the diffraction spot is indicated as the fcc-Co/Cu/NiFe in the diffraction diagram).

However, as the illustration in FIG. 18 shows, the second imaginary lines connecting the above-described diffraction spots and the beam origin are not coincident with each other.

Thus, it can be understood from the electron beam diffraction diagram of this embodiment that, in the antiferromagnetic layer and the ferromagnetic layer, one of the crystallographically identical planes generically described as the {111} planes is preferentially aligned parallel to the layer thickness, but the crystal planes other than the ones aligned parallel to the layer surface are not in a parallel relationship between the antiferromagnetic layer and the ferromagnetic layer.

It should be noted that, although the diffraction point assigned to the (−111) plane, i.e., the diffraction point located in a direction other than the layer thickness direction, appears in both the antiferromagnetic layer and the ferromagnetic layer, there may be an instance where the (−111) diffraction point appears in only one of the layers in the diffraction diagrams. An example of such an instance is when the crystal orientation of one layer is further rotated on an axis in the layer thickness direction from the crystal orientation of the other layer. In this case also, the crystal planes not aligned parallel to the layer surface are not in a parallel relationship between the antiferromagnetic layer and the ferromagnetic layer.

In contrast, in a transmission electron beam diffraction diagram of the comparison spin-valve film shown in FIG. 17, the diffraction spot indicative of the {111} plane of the antiferromagnetic layer (PtMn) appears in the layer thickness direction. The diffraction spot indicative of the {111} plane of a layer other than the antiferromagnetic layer (referred to as the fcc-Co/Cu/NiFe in the electron beam diffraction diagram) appears in the same layer thickness direction.

It should be noted here that, in the diffraction diagram shown in FIG. 17, the diffraction spots are labeled as family including all the crystallographically identical planes, namely (111) planes, instead of (111) plane or (11-1) plane. The notation in FIG. 17 is different from the notation in FIG. 16, but unlike FIG. 16, the [111] diffraction spots located in a direction other than the layer thickness direction (for example, (−111)) do not require an explanation.

Moreover, as is apparent from the transmission electron beam diffraction diagram of the comparison spin-valve film shown in FIG. 17, a diffraction spot indicative of the {200} plane of the antiferromagnetic layer (PtMn) appears in a direction other than the layer thickness direction. A diffraction spot indicative of the {200} plane of the layer other than the antiferromagnetic layer (in the diagram referred to as "fcc-Co/Cu/NiFe") appears in a direction other than the layer thickness direction.

As is apparent from the illustration shown in FIG. 19, in the comparison transmission electron beam diffraction diagram, a diffraction spot indicative of the {111} plane of the antiferromagnetic layer and the ferromagnetic layer appears in the layer thickness direction when viewed from the beam origin. The first imaginary lines connecting the diffraction points and the beam origin are coincident with each other in the diffraction diagrams of the antiferromagnetic layer and the ferromagnetic layer. Also, the second imaginary lines connecting the beam origin and the diffraction spots indicative of the {200} plane located in a direction other than the layer thickness direction when viewed from the beam origin are coincident with each other in the diffraction diagrams of the antiferromagnetic layer and the ferromagnetic layer.

In other words, in the comparison diffraction diagram, the crystal planes not aligned in the layer surface direction are in a parallel relationship between the antiferromagnetic layer and the ferromagnetic layer as a result of epitaxial deposition. The atomic arrangement of the antiferromagnetic layer and the atomic arrangement of the ferromagnetic layer readily enter into a one-to-one correspondence (the lattice-matching state) at the interface between the antiferromagnetic layer and the ferromagnetic layer. When there is a lattice-matching, a proper order transformation does not occur in the antiferromagnetic layer by the heat treatment, thus generating a reduced exchange coupling magnetic field.

The exchange coupling magnetic field (Hex) of the spin-valve film having the layer configuration according to the film for comparison is measured, and a low exchange coupling magnetic field of approximately $0.24 \times 10^4$ (A/m) is obtained.

In contrast, in this embodiment of the present invention, although the crystallographically identical planes are preferentially aligned parallel to the interface of the antiferromagnetic layer and the ferromagnetic layer, other crystal planes do not enter a parallel relationship between the antiferromagnetic layer and the ferromagnetic layer. As if the crystal orientations of the antiferromagnetic layer and the ferromagnetic layer are rotated about an axis perpendicular to the interface, the axes lying in these crystal planes preferentially aligned parallel to the interface are not oriented in the same direction between the antiferromagnetic layer and the ferromagnetic layer, at least partly.

As a result, the atomic arrangement of the antiferromagnetic layer and the atomic arrangement of the ferromagnetic layer do not exhibit a one-to-one correspondence. A proper order transformation occurs in the antiferromagnetic layer without being restrained by the crystal structure of the ferromagnetic layer when the antiferromagnetic layer is heat-treated, and an increased exchange coupling magnetic field can be obtained compared to the conventional technique.

The intensity of the exchange coupling magnetic field (Hex) obtained from the spin-valve film of the present invention is measured and a significantly high exchange coupling magnetic field of $10.9 \times 10^4$ (A/m) is obtained.

When the spin-valve film is capable of yielding the transmission electron beam diffraction image in FIGS. 16 and 18, a proper order transformation has taken place in the antiferromagnetic layer 4 as a result of heat treatment and a strong exchange coupling magnetic field can be obtained.

It should be noted here that the diffraction spot located in the above-described layer thickness direction is preferably the diffraction spot indicative of crystal planes generically described as {111}.

The crystal orientation of the antiferromagnetic layer 4 and the pinned magnetic layer 3 is further observed by transmission electron beam diffraction from an angle different from the above. When the obtained transmission electron beam diffraction images are as described below, it can be assumed that the crystal planes of the antiferromagnetic layer 4 and the pinned magnetic layer 3 aligned parallel to the layer surface are crystallographically identical and that a particular crystal axis lying in the crystal plane of the antiferromagnetic layer 4 and the same axis lying in the crystal plane of the pinned magnetic layer 3 are oriented, at least partly, in different directions.

Figure 20:
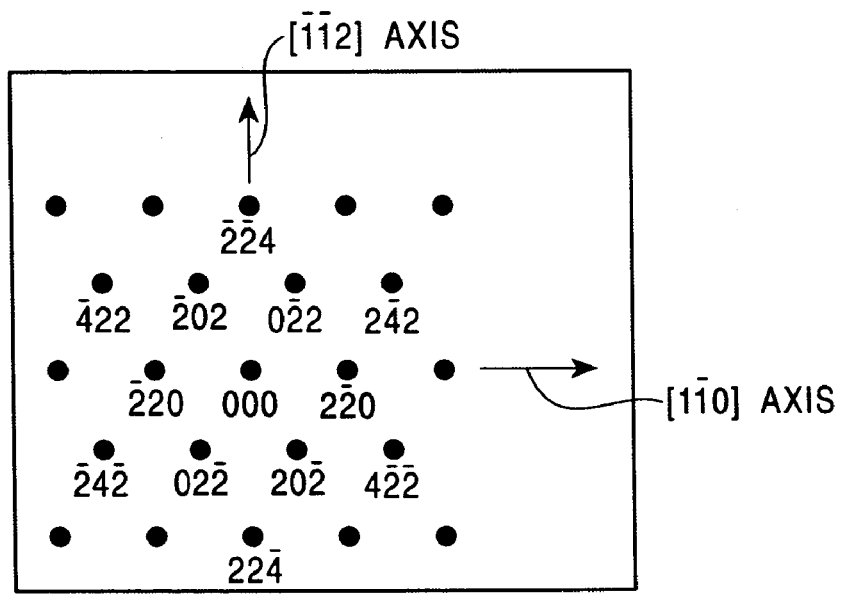
FIG. 20 is an illustration of a transmission electron beam diffraction diagram of the antiferromagnetic layer according to the present invention using an electron beam perpendicular to the layer surface.
Figure 21:
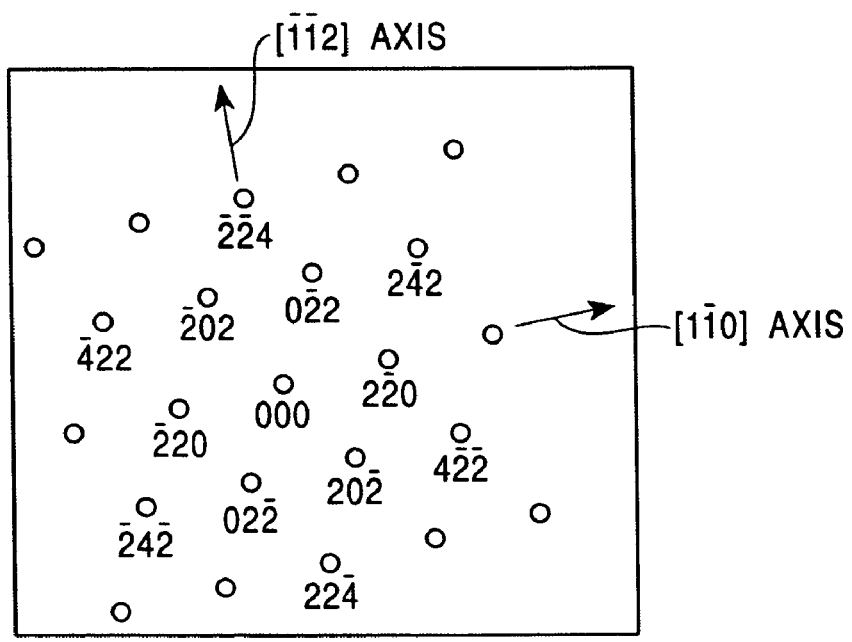
FIG. 21 is an illustration of a transmission electron beam diffraction diagram of the ferromagnetic layer according to the present invention using an electron beam perpendicular to the layer surface.

First, an electron beam enters from a direction perpendicular to the interface between the antiferromagnetic layer 4 and the pinned magnetic layer 3. The transmission electron beam diffraction diagrams of the antiferromagnetic layer 4 and that of the pinned magnetic layer 3 are obtained simultaneously. The obtained diagrams are shown in FIGS. 20 and 21. FIG. 20 is an illustration of the diffraction image of the antiferromagnetic layer 4 and FIG. 21 is an illustration of the diffraction image of the pinned magnetic layer 3.

In the transmission electron beam diffraction diagrams of the antiferromagnetic layer 4 and the pinned magnetic layer 3, the diffraction spots indicative of the same reciprocal lattice planes appear. Such reciprocal lattice planes, i.e., the projection planes of the electron beam diffraction image, are parallel to the crystal plane and perpendicular to the incident electron beam. An example of the crystal plane parallel to the above-described reciprocal lattice plane is the (111) plane. In this embodiment, the crystallographically identical axes generically described as <111> are preferably oriented in a direction perpendicular to the interface between the pinned magnetic layer 3 and the antiferromagnetic layer 4. Moreover, the crystal planes parallel to the above-described interface between the antiferromagnetic and the ferromagnetic layers are preferably crystallographically identical planes generically described as the {111} planes.

Next, using references showing the transmission electron beam diffraction diagrams of various single crystals, each of the diffraction spots is labeled. Since there is a difference between the lattice constants of the antiferromagnetic layer 4 and the pinned magnetic layer 3, i.e., between the lattice interplanar distances thereof, the transmission electron beam diffraction spots of the antiferromagnetic layer 4 can be easily discriminated from those of the pinned magnetic layer 3 by examining the distances between the respective diffraction spots and the beam origin (see FIG. 22).

Figure 22:
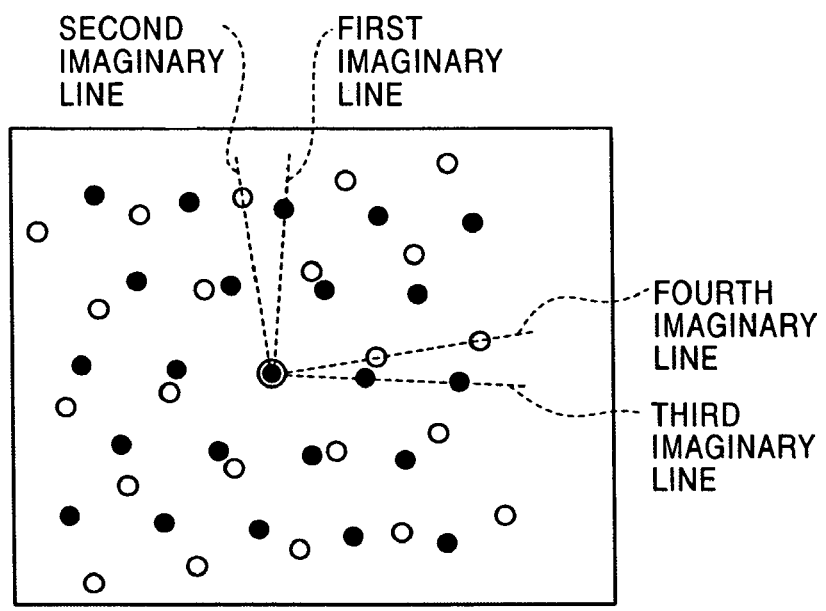
FIG. 22 is an illustration in which the transmission electron beam diffraction diagrams shown in FIGS. 20 and 21 are superimposed on each other.

With reference to FIG. 22, first and third imaginary lines connecting the beam origin and a particular diffraction spot given a particular label in the diffraction diagram of the antiferromagnetic layer 4 are not coincident with the second and fourth imaginary lines connecting the beam origin and the diffraction spot, given the same label, of the pinned magnetic layer 3, indicating that crystallographically identical axes lying in the crystal planes aligned parallel to the layer surface are oriented in different directions between the antiferromagnetic layer 4 and the pinned magnetic layer 3. Another indication that the crystallographically identical axes lying in the crystal planes aligned parallel to the layer surface are oriented in, different directions between the antiferromagnetic layer 4 and the pinned magnetic layer 3 is when a diffraction spot given a particular label only appears in one of the diffraction diagrams of the pinned magnetic layer 3 and the antiferromagnetic layer 4.

The transmission electron beam diffraction diagrams obtained using an electron beam perpendicular to the interface will be described in particular detail with reference to FIGS. 20 to 22.

FIGS. 20 to 22 are perspective illustrations of the above-described transmission electron beam diffraction diagrams.

The transmission electron beam diffraction pattern shown in FIG. 20 illustrates the electron beam diffraction pattern of a PtMn crystal. FIG. 21 illustrates the electron beam diffraction pattern of a crystal in the ferromagnetic layer (fcc-Co). FIG. 22 is an illustration combining the diagrams in FIGS. 20 and 21 aligning on the diffraction spot (000) (the beam origin) of each diagram.

The black dots in FIG. 20 indicate diffraction spots. Each of the diffraction spots is labeled. The circles in FIG. 21 indicate diffraction spots, each of which is also labeled.

As shown in FIG. 20, the crystal axis connecting the beam origin (000) and the diffraction spot (−2-24) is the [−1-12] axis. The crystal axis connecting the beam origin (000) and the diffraction spot (2-20) is the [1-10] axis.

The same labeling is performed in the diffraction pattern shown in FIG. 21. Although the [−1-12] axis and the [1-10] axis are indicated, these crystal axes are oriented in a direction different from the corresponding crystal axes shown in FIG. 20.

As is apparent from the combined diffraction diagram in FIG. 22 aligning the diffraction patterns of FIGS. 20 and 21, a first imaginary line connecting the diffraction spot (−2-24) of the antiferromagnetic layer and the beam origin (000), and a second imaginary line connecting the diffraction spot (−2-24) and the beam origin (000) are not coincident with each other. A third imaginary line connecting the diffraction spot (2-20) of the antiferromagnetic layer and the beam origin (000), and a fourth imaginary line connecting the beam origin and the diffraction spot (2-20) of the ferromagnetic layer, are not coincident with each other.

It can be understood from the above-described transmission electron beam diffraction diagrams that the crystal planes of the antiferromagnetic layer and the ferromagnetic layer preferentially aligned parallel to the layer surface are crystallographically identical and that the crystallographically identical crystal axes lying in these crystal planes are oriented in different directions between the antiferromagnetic layer and the ferromagnetic layer. In other words, the crystal planes not aligned parallel to the layer surface, and are not in a parallel relationship between the antiferromagnetic layer and the ferromagnetic layer.

Figure 23:
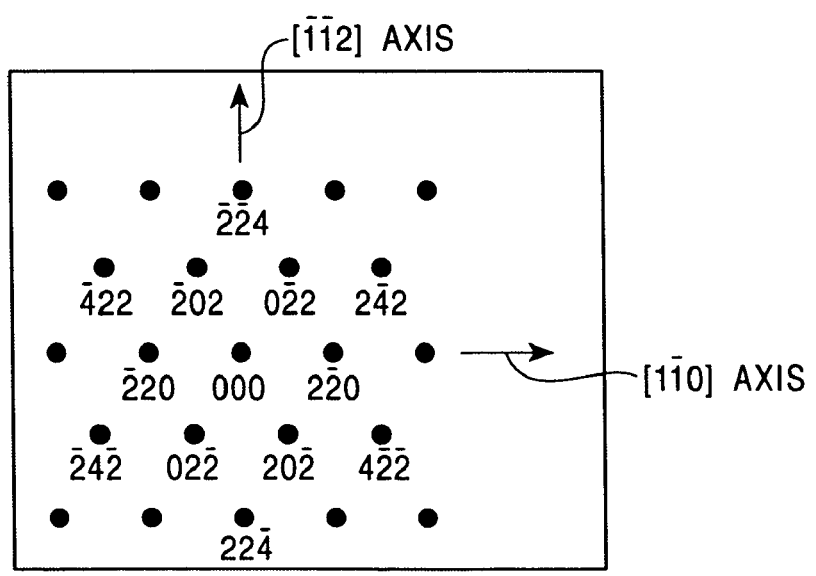
FIG. 23 is an illustration of a transmission electron beam diffraction diagram of the antiferromagnetic layer for comparison using an electron beam perpendicular to the layer surface.
Figure 24:
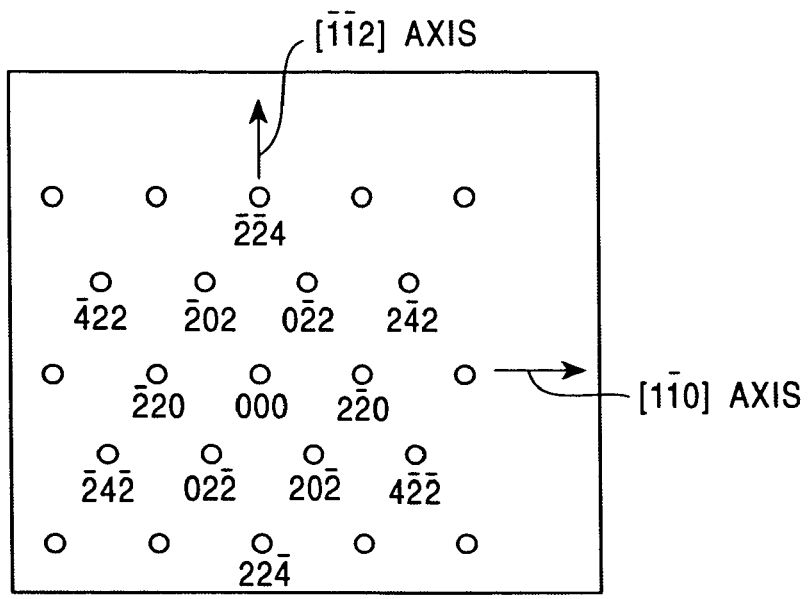
FIG. 24 is an illustration of a transmission electron beam diffraction diagram of the ferromagnetic layer for comparison using an electron beam perpendicular to the layer surface.
Figure 25:
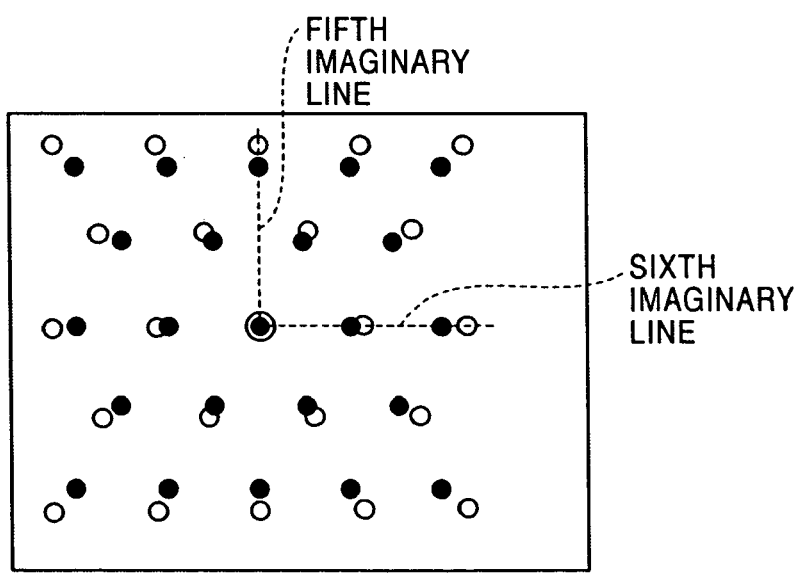
FIG. 25 is an illustration in which the transmission electron beam diffraction diagrams shown in FIGS. 23 and 24 are superimposed on each other.

FIGS. 23 to 25 are transmission electron beam diffraction diagrams obtained from the comparison spin-valve film. FIG. 23 is a transmission electron beam diffraction diagram of a crystal in the antiferromagnetic layer (PtMn). FIG. 24 is a transmission electron beam diffraction diagram of a crystal in the ferromagnetic layer (fcc-Co). FIG. 25 is a diffraction pattern combining the diffraction diagrams of FIGS. 23 and 24 while aligning the beam origin.

As shown in FIGS. 23 and 24, the [−1-12] axes each connecting the beam origin and the diffraction spot (−2-24) in the antiferromagnetic layer and the ferromagnetic layer are oriented in the same direction. The [1-10] axes each connecting the beam origin and the diffraction spot (2-20) are also oriented in the same direction between the antiferromagnetic layer and the ferromagnetic layer.

In other words, as shown in FIG. 25, the fifth imaginary lines each connecting the beam origin and the diffraction spot (−2-24) are coincident with each other in the diffraction diagrams of the antiferromagnetic layer and the ferromagnetic layer. The sixth imaginary lines each connecting the beam origin and the diffraction spot (2-20) are also coincident with each other in the diffraction diagrams of the antiferromagnetic layer and the ferromagnetic layer.

In the comparison spin-valve film, not only are the crystal planes preferentially aligned parallel to the layer surface crystallographically identical in the antiferromagnetic layer and the ferromagnetic layer, but the crystallographically identical axes lying in these crystal planes are also perfectly coincident with each other between the antiferromagnetic layer and the ferromagnetic layer. Consequently, the crystal planes other than the ones aligned parallel to the layer surface are in a parallel relationship between the antiferromagnetic layer and the ferromagnetic layer.

The diffraction diagrams obtained from the spin-valve film of the this embodiment and the diffraction diagrams obtained from the comparison spin-valve film are clearly different, as can be understood from FIGS. 23 to 25.

When transmission electron beam diffraction diagrams as in FIGS. 20 to 22 are obtained, it can be assumed that the crystal planes of the antiferromagnetic layer 4 and the pinned magnetic layer 3 aligned parallel to the layer surface are crystallographically identical and that a particular crystal axis lying in the crystal plane of the antiferromagnetic layer 4 and the crystallographically identical axis lying in the crystal plane of the pinned magnetic layer 3 are oriented, at least partly, in different directions.

When the spin-valve film is capable of yielding the transmission electron beam diffraction diagrams as in FIGS. 20 to 22, a proper order transformation has occurred in the antiferromagnetic layer 4 during heating. As a result, a strong exchange coupling magnetic field can be obtained.

Next, in order to prepare a spin-valve thin-film magnetic element having the above-described crystal orientations and crystal grain boundaries, the antiferromagnetic layer 4 and the pinned magnetic layer 3 need to be in a lattice-mismatching state after deposition thereof.

The lattice-mismatching state refers to a state in which the atomic configuration of the antiferromagnetic layer 4 does not show a one-to-one correspondence with the atomic configuration of the pinned magnetic layer 3 at the interface therebetween. In order to yield such a lattice-mismatching state, it is necessary to make the lattice constant of the antiferromagnetic layer 4 larger than the lattice constant of the pinned magnetic layer 3.

In addition, the antiferromagnetic layer 4 is required to undergo a proper order transformation as a result of a heat treatment. The intensity of the generated exchange coupling magnetic field will be low if the antiferromagnetic layer 4 does not undergo the order transformation even if the lattice-mismatching state is obtained at the interface.

In order to bring about the lattice-mismatching state during the deposition step and to achieve an order transformation, the ratio of each component composing the antiferromagnetic layer 4 is important.

In this embodiment, the X or X+X' content is preferably in the range of 45 to 60 atomic percent. In this manner, the lattice-mismatching state can be achieved at the interface with the pinned magnetic layer 3 and a proper order transformation will take place in the antiferromagnetic layer 4 by heating.

In the spin-valve thin-film element using the antiferromagnetic layer 4 formed according to the above-described ratio, the crystal planes of the antiferromagnetic layer 4 and the pinned magnetic layer 3 preferentially aligned parallel to the layer surface can be in crystallographically identical planes. It is also possible to orient particular crystallographically identical axes lying in the crystal plane of the antiferromagnetic layer 4 in a direction different from that of the pinned magnetic layer 3, at least partly. Moreover, it is possible to make the crystal grain boundaries of the antiferromagnetic layer 4 discontinuous with the crystal grain boundaries of the pinned magnetic layer 3, at least partly. When the above-described ratio is met, an exchange coupling magnetic field of more than $1.58 \times 10^4$ (A/m) can be generated, as shown in the experimental example described below.

Preferably, the content of element X or the total content of elements X and X' is in the range of 49 to 56.5 atomic percent. In this manner, an exchange coupling magnetic field of $7.9 \times 10^4$ (A/m) or more can be generated.

According to the spin-valve thin-film element having the above-described crystal orientations, it is possible to put at least part of the interface between the pinned magnetic layer 3 and the antiferromagnetic layer 4 into a lattice-mismatching state after the heat treatment.

The same crystal structure and the transmission electron beam diffraction diagram as in the interface between the antiferromagnetic layer 4 and the pinned magnetic layer 3 are also achieved at the interface between the seed layer 22 and the antiferromagnetic layer 4. That is, at the interface between the seed layer 22 and the antiferromagnetic layer 4, crystallographically identical planes are preferentially aligned parallel to the layer surface, and crystallographically identical axes lying in these crystal plane are oriented in different directions between the seed layer 22 and the antiferromagnetic layer 4, at least partly.

Moreover, in a cross-section parallel to the layer thickness direction, the crystal grain boundaries of the seed layer 22 and those of the antiferromagnetic layer 4 are discontinuous at the interface, at least partly.

When the seed layer 22 and the antiferromagnetic layer 4 have such crystal orientations and crystal grain boundaries, it is easy for at least part of the interface between the seed layer 22 and the antiferromagnetic layer 4 to maintain the lattice-mismatching state. As a result, a proper order transformation will occur in the antiferromagnetic layer 4 without being restrained by the crystal structure of the seed layer 22, thereby generating a strong exchange coupling magnetic field.

In this embodiment, the thickness of the antiferromagnetic layer 4 is preferably in the range of 7 nm to 30 nm. According to the embodiment, a sufficiently strong exchange coupling magnetic field can be generated even when the thickness of the antiferromagnetic layer 4 is reduced to the above range.

Figure 2:
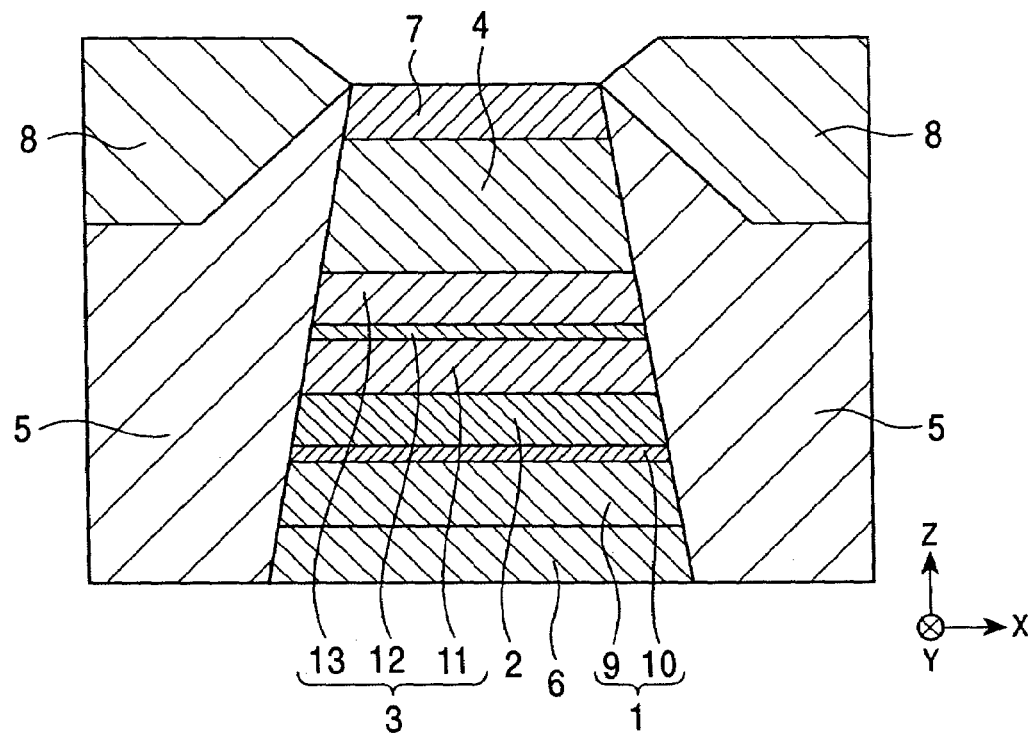
FIG. 2 is a cross-section illustrating the structure of a single spin-valve magnetoresistive element according to a second embodiment of the present invention as viewed from an air bearing surface side.

FIG. 2 is a sectional view showing a part of the structure of a spin-valve thin-film element according to a second embodiment of the present invention.

This spin-valve thin-film element comprises: an underlayer 6; a free magnetic layer 1 comprising a NiFe alloy layer 9 and a Co layer 10; a nonmagnetic interlayer 2, and a pinned magnetic layer 3 comprising a Co layer 11, a Ru layer 12, a Co layer 13; an antiferromagnetic layer 4; and a protective layer 7, deposited on that order. Hard bias layers 5 and conductive layers 8 are provided on two sides of the deposited layers.

Each of the above layers is composed of the same material as in the first embodiment of the spin-valve thin-film element shown in FIG. 1.

In the antiferromagnetic layer 4 and the pinned magnetic layer 3 of the spin-valve thin-film element shown in FIG. 2, the crystal planes of the antiferromagnetic layer 4 and the pinned magnetic layer 3 preferentially aligned parallel to the layer surface are crystallographically identical, and particular crystallographically identical crystal axes lying in these crystal planes of the antiferromagnetic layer 4 and the pinned magnetic layer 3 are oriented in different directions, at least partly.

Moreover, in a cross-section of the antiferromagnetic layer 4 and the pinned magnetic layer 3 parallel to the layer thickness direction (the Z direction in the drawing), the crystal grain boundaries of the antiferromagnetic layer 4 and those of the pinned magnetic layer 3 are discontinuous at the interface, at least partly.

As a result, at least part of the above interface keeps the lattice-mismatching state, a proper order transformation can be achieved in the antiferromagnetic layer 4 as a result of the heat treatment, and an increased exchange coupling magnetic field can be obtained.

Preferably, the crystal planes of the antiferromagnetic layer 4 and the pinned magnetic layer 3 preferentially aligned parallel to the layer surface are the crystallographically identical planes generically described as the {111} planes. Preferably, the crystallographically identical axes generically described as the <110> axes are oriented in different directions between the antiferromagnetic layer 4 and the pinned magnetic layer 3.

In the spin-valve thin-film element shown in FIG. 2, diffraction spots corresponding to the reciprocal lattice points indicative of crystal planes of the antiferromagnetic layer 4 and the pinned magnetic layer 3 appear in transmission electron beam diffraction diagrams of the antiferromagnetic layer 4 and the pinned magnetic layer 3 using an electron beam entering in a direction parallel to the interface thereof. One diffraction spot which is given the same label and being located in the layer thickness direction when viewed from the beam origin is selected and a first imaginary line connecting the diffraction spot and the beam origin is drawn for each of the diffraction diagrams. The first imaginary line in the diffraction diagram of the pinned magnetic layer 3 and the first imaginary line in the diffraction diagram of the antiferromagnetic layer 4 are coincident with each other.

Moreover, a second imaginary line in the diffraction diagram of the antiferromagnetic layer 4, connecting the beam origin and a diffraction spot indicative of a particular crystal plane and located in a direction other than the layer thickness direction when viewed from the beam origin does not coincide with a second imaginary line drawn in the same manner in the diffraction diagram of the pinned magnetic layer 3. In other cases, the diffraction spot indicative of a certain crystal plane and located in a direction other than the layer thickness direction appears in only one of the diffraction diagrams of the antiferromagnetic layer and ferromagnetic layer.

The diffraction spot located in the layer thickness direction is preferably the one indicating one of the crystallographically identical planes generically described as the {111} planes.

Furthermore, in the spin-valve thin-film element shown in FIG. 2, diffraction spots corresponding to the reciprocal lattice points indicative of the crystal planes of the pinned magnetic layer 3 and the antiferromagnetic layer 4 appear in the transmission electron beam diffraction diagrams obtained using an electron beam entering from a direction perpendicular to the interface between the antiferromagnetic layer 4 and the pinned magnetic layer 3. Among the diffraction spots, one diffraction spot given the same label in the diffraction diagrams of the pinned magnetic layer 3 and the antiferromagnetic layer 4 is selected and a imaginary line connecting the diffraction spot and the beam origin is drawn for each of the diffraction diagrams. The imaginary lines are not coincident with each other at the diffraction diagrams of the pinned magnetic layer 3 and that of the antiferromagnetic layer 4. In other cases, the diffraction spot appears in only one of the diffraction diagrams of the antiferromagnetic layer 4 and the pinned magnetic layer 3.

Preferably, the direction perpendicular to the above-described interface is the direction of the crystallographically identical axes generically described as the <111> axes. Moreover, the crystal planes preferentially aligned parallel to the interface between the antiferromagnetic layer and the ferromagnetic layer are preferably the crystallographically identical planes generically described as the {111}planes.

When the transmission electron beam diagrams as described above are obtained, it can be assumed that the crystal planes of the antiferromagnetic layer 4 and the pinned magnetic layer 3 preferentially aligned parallel to the layer surface are crystallographically identical and that particular crystallographically identical crystal axes lying in these crystal planes of the antiferromagnetic layer 4 and the pinned magnetic layer 3 are oriented in different directions, at least partly.

Also, in the spin-valve thin-film element having the above-described transmission electron beam diffraction diagrams, a proper order transformation occurs in the antiferromagnetic layer 4 as a result of heat treatment, and an increased coupling magnetic field compared to the conventional technique can be obtained.

In the spin-valve thin-film element shown in FIG. 2, the content X or the total content X and X' constituting the antiferromagnetic layer 4 is preferably in the range of 45 to 60 atomic percent. In this manner, an exchange coupling magnetic field of $1.58 \times 10^4$ (A/m) or more can be obtained.

More preferably, the X or X+X' content is preferably in the range of 49 to 57 atomic percent. In this manner, an exchange coupling magnetic field of $7.9 \times 10^4$ (A/m) or more can be obtained.

Figure 3:
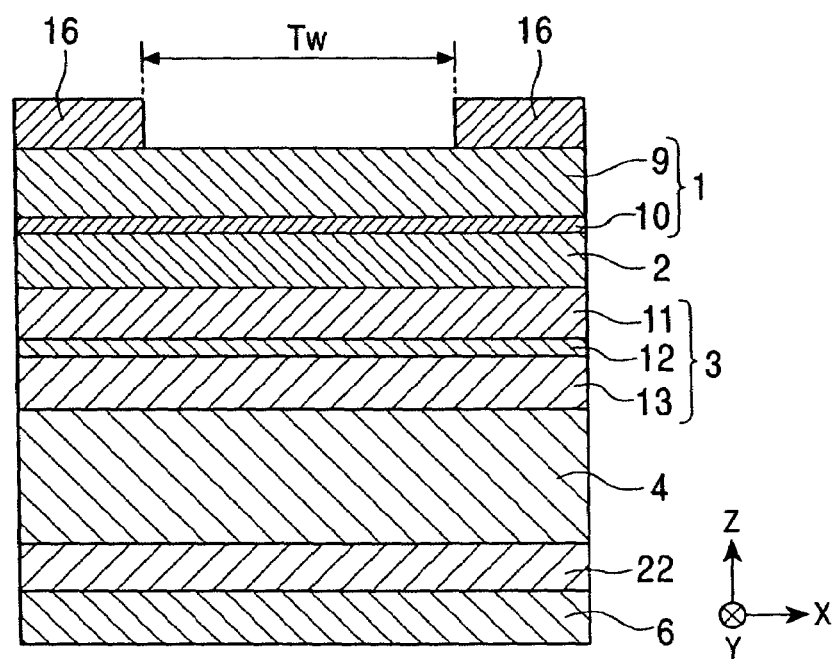
FIG. 3 is a cross-section illustrating the structure of a single spin-valve magnetoresistive element according to a third embodiment of the present invention as viewed from an air bearing surface side.

FIG. 3 is a cross-sectional view showing part of the structure of a spin-valve thin-film element according to a third embodiment of the present invention.

Referring to FIG. 3, an underlayer 6, a seed layer 22, an antiferromagnetic layer 4, a pinned magnetic layer 3, a nonmagnetic interlayer 2, and a free magnetic layer 1 are deposited in that order from the bottom.

The underlayer 6 preferably comprises at least one element selected from the group consisting of Ta, Hf, Nb, Zr, Ti, Mo, and W.

Preferably, the seed layer 22 has a face-centered cubic crystal structure and has one of the crystallographically identical planes generically described as the {111} planes preferentially aligned parallel to the interface with the antiferromagnetic layer 4. The material thereof and other factors regarding the seed layer 22 are identical to the first embodiment shown in FIG. 1.

When the seed layer 22 is provided under the antiferromagnetic layer 4, each of the antiferromagnetic layer 4, the pinned magnetic layer 3, the nonmagnetic interlayer 2, and the free magnetic layer 1 deposited thereon has the same crystallographically identical planes preferentially aligned parallel to the layer surface.

As shown in FIG. 3, the pinned magnetic layer 3 comprises three layers, namely Co layers 11 and 13 and a Ru layer 12. Alternatively, the pinned magnetic layer 3 may be formed of other materials and may be composed of, for example, one layer instead of three.

Although the free magnetic layer 1 comprises two layers, namely a NiFe alloy layer 9 and a Co layer 10, in this embodiment, the free magnetic layer 1 may be formed of other materials and may be composed of, for example, one layer instead of two layers.

In the spin-valve thin-film element shown in FIG. 3, the crystal planes of the antiferromagnetic layer 4 and the pinned magnetic layer 3 preferentially aligned parallel to the layer surface are crystallographically identical and that particular crystallographically identical crystal axes lying in these crystal planes of the antiferromagnetic layer 4 and the pinned magnetic layer 3 are oriented in different directions, at least partly.

Moreover, in a cross-section of the antiferromagnetic layer 4 and the pinned magnetic layer 3 parallel to the layer thickness direction (the Z direction in the drawing), the crystal grain boundaries of the antiferromagnetic layer 4 and those of the pinned magnetic layer 3 are discontinuous at the interface, at least partly.

As a result, at least part of the interface keeps the lattice-mismatching state. A proper order transformation occurs in the antiferromagnetic layer 4 as a result of heat treatment and a strong exchange coupling magnetic field can be obtained.

Preferably, the crystal planes of the antiferromagnetic layer 4 and the pinned magnetic layer 3 preferentially aligned parallel to the layer surface are the crystallographically identical planes generically described as the {111} planes. Preferably, the crystallographically identical axes generically described as the <110> axes are oriented in different directions between the antiferromagnetic layer 4 and the pinned magnetic layer 3.

In the spin-valve thin-film element shown in FIG. 3, diffraction spots corresponding to the reciprocal lattice points indicative of crystal planes of the antiferromagnetic layer 4 and the pinned magnetic layer 3 appear in transmission electron beam diffraction diagrams of the antiferromagnetic layer 4 and the pinned magnetic layer 3 using an electron beam entering in a direction parallel to the interface thereof. One diffraction spot given the same label and being located in the layer thickness direction when viewed from the beam origin is selected and a first imaginary line connecting the diffraction spot and the beam origin is drawn for each of the diffraction diagrams. The first imaginary line in the diffraction diagram of the pinned magnetic layer 3 and the first imaginary line in the diffraction diagram of the antiferromagnetic layer 4 are coincident with each other.

Moreover, in this embodiment, a second imaginary line in the diffraction diagram of the antiferromagnetic layer, the line connecting the beam origin and a diffraction spot indicative of a particular crystal plane and located in the direction other than the layer thickness direction when viewed from the beam origin, does not coincide with that in the diffraction diagram of the ferromagnetic layer. In other cases, a diffraction spot indicative of a particular crystal plane and located in a direction other than the layer thickness direction appears only in one of the diffraction diagrams of the antiferromagnetic layer and the ferromagnetic layer.

Preferably, the diffraction spot located in the thickness direction indicates one of the crystallographically identical planes generically described as the {111} planes.

Furthermore, in the spin-valve thin-film element shown in FIG. 3, diffraction spots corresponding to the reciprocal lattice points indicative of the crystal planes of the pinned magnetic layer 3 and the antiferromagnetic layer 4 appear in the transmission electron beam diffraction diagrams obtained using an electron beam entering from a direction perpendicular to the interface between the antiferromagnetic layer 4 and the pinned magnetic layer 3. Among the diffraction spots, one diffraction spot given the same label in the diffraction diagrams of the pinned magnetic layer 3 and the antiferromagnetic layer 4 is selected for each of the diffraction diagrams and a imaginary line connecting the diffraction spot and the beam origin is drawn for each of the diffraction diagrams. The imaginary lines are not coincident with each other at the diffraction diagrams of the pinned magnetic layer 3 and that of the antiferromagnetic layer 4. In other cases, the diffraction spot appears in only one of the diffraction diagrams of the antiferromagnetic layer 4 and the pinned magnetic layer 3.

The direction perpendicular to the above-described interface is preferably the direction of the crystallographically identical axes generically described as the <111> direction. Moreover, the crystal planes parallel to the above-described interface between the antiferromagnetic layer and the ferromagnetic layer are preferably the crystallographically identical planes generically described as the {111} planes.

When the transmission electron beam diffraction diagrams described above are obtained, it can be assumed that the crystal planes of the antiferromagnetic layer 4 and the pinned magnetic layer 3 preferentially aligned parallel to the layer surface are crystallographically identical and that particular crystallographically identical crystal axes lying in these crystal planes of the antiferromagnetic layer 4 and the pinned magnetic layer 3 are oriented in different directions, at least partly.

In the spin-valve thin-film element shown in FIG. 3, the content X or X+X' constituting the antiferromagnetic layer 4 is preferably in the range of 45 to 60 atomic percent. In this manner, an exchange coupling magnetic field of $1.58 \times 10^4$ (A/m) or more can be obtained.

More preferably, in the present invention, the content X or X+X' is in the range of 49 to 57 atomic percent. In this manner, an exchange coupling magnetic field of $7.9 \times 10^4$ (A/m) or more can be obtained.

As shown in FIG. 3, exchange bias layers (antiferromagnetic layers) 16 formed on the free magnetic layer 1 are separated in the track width direction (the X direction in the drawing) by a gap corresponding to the track width Tw.

The exchange bias layers 16 comprise an X—Mn alloy wherein X is at least one element selected from the group consisting of Pt, Pd, Ir, Rh, Ru, and Os. More preferably, the exchange bias layers 16 comprise a PtMn alloy or an X—Mn—X' alloy, wherein X' is at least one element selected from the group consisting of Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Sn, Hf, Ta, W, Re, Au, Pb, and rare earth group elements.

In this embodiment, the crystal planes of the exchange bias layers 16 and the free magnetic layer 1 preferentially aligned parallel to the layer surface are crystallographically identical, and that the particular crystallographically identical crystal axes lying in these crystal planes of exchange bias layers 16 and the free magnetic layer 1 are oriented in different directions, at least partly.

Moreover, in a cross-section of the exchange bias layers 16 and the free magnetic layer 1 parallel to the layer thickness direction (the Z direction in the drawing), the crystal grain boundaries of the exchange bias layers 16 and those of the free magnetic layer 1 are discontinuous at the interface, at least partly.

As a result, at least part of the above interface keeps the lattice-mismatching state, a proper order transformation can be achieved in the exchange bias layers 16 as a result of the heat treatment, and an increased exchange coupling magnetic field can be obtained.

Preferably, the crystal planes of the exchange bias layers 16 and the free magnetic layer 1 preferentially aligned parallel to the layer surface are the crystallographically identical planes generically described as the {111} planes. Preferably, the crystallographically identical axes generically described as the <110> axes are oriented in different directions between the exchange bias layers 16 and the free magnetic layer 1.

In the spin-valve thin-film element shown in FIG. 3, diffraction spots corresponding to the reciprocal lattice points indicative of crystal planes of the exchange bias layers 16 and the free magnetic layer 1 appear in transmission electron beam diffraction diagrams of each layer using an electron beam entering in a direction parallel to the interface thereof. One diffraction spot which is given the same label and being located in the layer thickness direction when viewed from the beam origin is selected and a first imaginary line connecting the diffraction spot and the beam origin is drawn for each of the diffraction diagrams. The first imaginary line in the diffraction diagram of the exchange bias layers 16 and the first imaginary line in the diffraction diagram of the free magnetic layer 1 are coincident with each other.

Moreover, a second imaginary line in the diffraction diagram of the antiferromagnetic layer, connecting the beam origin and a diffraction spot indicative of a particular crystal plane and located in a direction other than the layer thickness direction when viewed from the beam origin, does not coincide with a second imaginary line drawn in the same manner in the diffraction diagram of the ferromagnetic layer. In other cases, the diffraction spot indicative of a certain crystal plane and located in a direction other than the layer thickness direction appears in only one of the diffraction diagrams of the antiferromagnetic layer and ferromagnetic layer.

The diffraction spot located in the layer thickness direction is preferably the one indicating one of the crystallographically identical planes generically described as the {111} planes.

Furthermore, in the spin-valve thin-film element shown in FIG. 3, diffraction spots corresponding to the reciprocal lattice points indicative of the crystal planes of the exchange bias layers 16 and the free magnetic layer 1 appear in the transmission electron beam diffraction diagrams obtained using an electron beam entering from a direction perpendicular to the interface between the above-described interface. Among the diffraction spots, one diffraction spot given the same label in the diffraction diagrams of the exchange bias layers 16 and the free magnetic layer 1 is selected and a imaginary line connecting the diffraction spot and the beam origin is drawn for each of the diffraction diagrams. The imaginary lines are not coincident with each other at the diffraction diagrams of the exchange bias layers 16 and the free magnetic layer 1. In other cases, the diffraction spot appears in only one of the diffraction diagrams of the exchange bias layers 16 and the free magnetic layer 1.

Preferably, the direction perpendicular to the above-described interface is the direction of the crystallographically identical axes generically described as the <111> axes. Moreover, the crystal planes preferentially aligned parallel to the interface between the antiferromagnetic layer and the ferromagnetic layer are preferably the crystallographically identical planes generically described as the {111} planes.

When a spin-valve thin-film element has the transmission electron beam diagrams described above, it can be assumed that the crystal planes of the exchange bias layers 16 and the free magnetic layer 1 preferentially aligned parallel to the layer surface are crystallographically identical and that particular crystallographically identical crystal axes lying in these crystal planes of the exchange bias layers 16 and the pinned free magnetic layer 1 are oriented in different directions, at least partly. Also, in the spin-valve thin-film element having the above-described transmission electron beam diffraction images, a proper order transformation occurs in the exchange bias layers 16 as a result of heat treatment, and an increased coupling magnetic field compared to the conventional technique can be obtained.

At the two side portions of the free magnetic layer 1, the free magnetic layer 1 is put into a single domain state in the X direction in the drawing by the exchange coupling magnetic field generated between the exchange bias layers 16 and the free magnetic layer 1. The track width (Tw) areas of the free magnetic layer 1 are adequately magnetized in the X direction in the drawing to the extent that the area is sensitive toward an external magnetic field.

In the single spin-valve magnetoresistive element having the above configuration, the magnetization vector of the track width (Tw) areas of the free magnetic layer 1 changes from the X direction to the Y direction in the drawing in response to an external magnetic field working in the Y direction in the drawing. As the magnetization vector in the free magnetic layer 1 is changed, the electrical resistance is changed relative to the pinned magnetization vector (the Y direction in the drawing) of the pinned magnetic layer 3. The change in electrical resistance leads to a change in voltage, and the leakage magnetic field from a recording medium is detected as the change in voltage.

Figure 4:
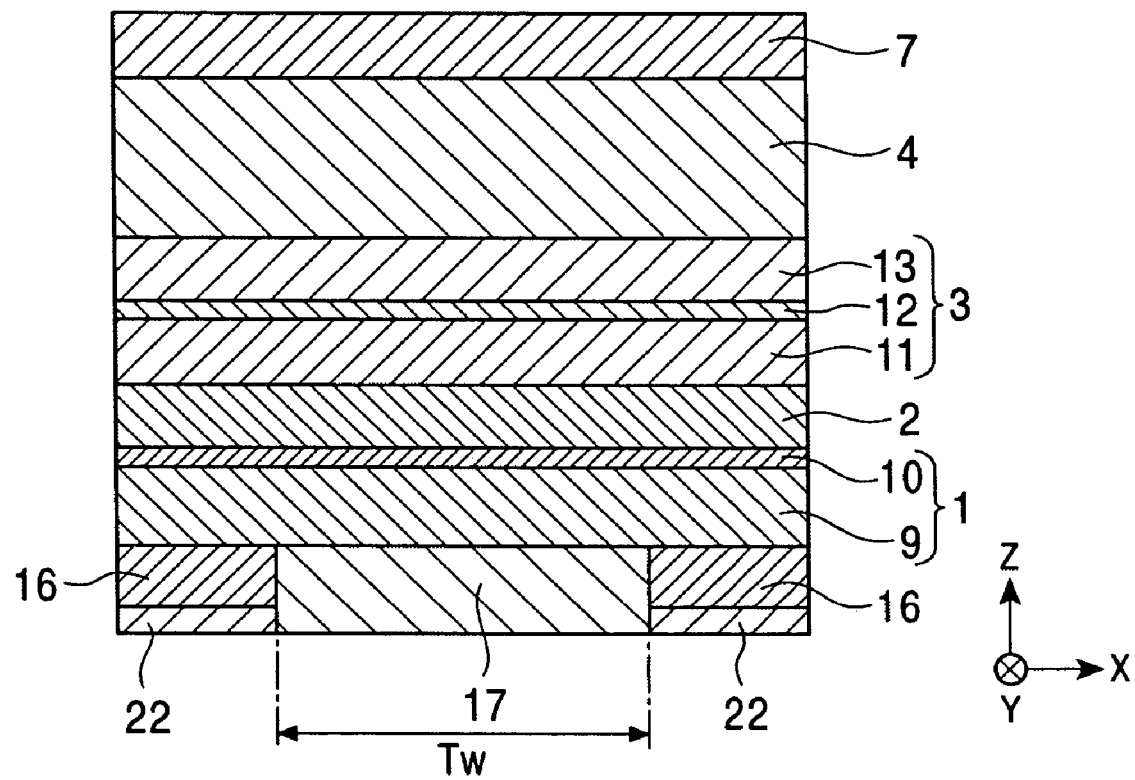
FIG. 4 is a cross-section illustrating the structure of a single spin-valve magnetoresistive element according to a fourth embodiment of the present invention as viewed from an air bearing surface side.

FIG. 4 is a cross-sectional view showing part of the structure of a spin-valve thin-film element according to a fourth embodiment of the present invention.

Referring to FIG. 4, a pair of seed layers 22 separated in the track width direction (the X direction in the drawing) by the gap corresponding to the track width (Tw) is formed. Exchange bias layers 16 are formed on the seed layers 22.

An insulation layer 17 comprising an insulating material such as $SiO_2$ or $Al_2O_3$ fills the gap between the seed layers 22 and the exchange bias layers 16.

A free magnetic layer 1 is formed on the exchange bias layers 16 and the insulation layer 17.

The exchange bias layers 16 comprise an X—Mn alloy or an X—Mn—X' alloy. The content X or X+X' is preferably in the range of 45 to 60 atomic percent, and more preferably in the range of 49 to 56.5 atomic percent.

A proper order transformation occurs in the exchange bias layers 16 as a result of heat treatment without being restrained by the crystal structure of the free magnetic layer 1. Consequently, an increased exchange coupling magnetic field can be obtained compared to the conventional technology.

In this embodiment, the crystal planes of the exchange bias layers 16 and the free magnetic layer 1 preferentially aligned parallel to the layer surface are crystallographically identical after the heat treatment. Particular crystal axes lying in these crystal planes of exchange bias layers 16 and the free magnetic layer 1 are oriented in different directions, at least partly.

Moreover, in a cross-section of the exchange bias layers 16 and the free magnetic layer 1 parallel to the layer thickness direction (the Z direction in the drawing), the crystal grain boundaries of the exchange bias layers 16 and those of the free magnetic layer 1 are discontinuous at the interface, at least partly.

As a result, at least part of the above interface keeps the lattice-mismatching state, a proper order transformation can be achieved in the exchange bias layers 16 as a result of the heat treatment, and an increased exchange coupling magnetic field can be obtained.

Preferably, the crystal planes of the exchange bias layers 16 and the free magnetic layer 1 preferentially aligned parallel to the layer surface are the crystallographically identical planes generically described as the {111} planes. Preferably, the crystallographically identical axes generically described as the <110> axes are oriented in different directions between the exchange bias layers 16 and the free magnetic layer 1.

In the spin-valve thin-film element shown in FIG. 4, diffraction spots corresponding to the reciprocal lattice points indicative of crystal planes of the exchange bias layers 16 and the free magnetic layer 1 appear in transmission electron beam diffraction diagrams of each layer using an electron beam entering in a direction parallel to the interface thereof. One diffraction spot which is given the same label and being located in the layer thickness direction when viewed from the beam origin is selected and a first imaginary line connecting the diffraction spot and the beam origin is drawn for each of the diffraction diagrams. The first imaginary line in the diffraction diagram of the exchange bias layers 16 and the first imaginary line in the diffraction diagram of the free magnetic layer 1 are coincident with each other.

Moreover, a second imaginary line in the diffraction diagram of the antiferromagnetic layer, connecting the beam origin and a diffraction spot indicative of a particular crystal plane and located in a direction other than the layer thickness direction when viewed from the beam origin does not coincide with a second imaginary line drawn in the same manner in the diffraction diagram of the ferromagnetic layer. In other cases, the diffraction spot indicative of a certain crystal plane and located in a direction other than the layer thickness direction appears in only one of the diffraction diagrams of the antiferromagnetic layer and ferromagnetic layer.

The diffraction spot located in the layer thickness direction is preferably the one indicating one of the crystallographically identical planes generically described as the {111} planes.

Furthermore, in the spin-valve thin-film element shown in FIG. 4, diffraction spots corresponding to the reciprocal lattice points indicative of the crystal planes of the exchange bias layers 16 and the free magnetic layer 1 appear in the transmission electron beam diffraction diagrams obtained using an electron beam entering from a direction perpendicular to the interface between the above-described interface. Among the diffraction spots, one diffraction spot given the same label in the diffraction diagrams of the exchange bias layers 16 and the free magnetic layer 1 is selected and a imaginary line connecting the diffraction spot and the beam origin is drawn for each of the diffraction diagrams. The imaginary lines are not coincident with each other at the diffraction diagrams of the exchange bias layers 16 and the free magnetic layer 1. In other cases, the diffraction spot appears in only one of the diffraction diagrams of the exchange bias layers 16 and the free magnetic layer 1.

Preferably, the direction perpendicular to the above-described interface is the direction of the crystallographically identical axes generically described as the <111> axes.

Moreover, the crystal planes preferentially aligned parallel to the interface between the antiferromagnetic layer and the ferromagnetic layer are preferably the crystallographically identical planes generically described as the {111} planes.

When the transmission electron beam diagrams as described above are obtained, it can be assumed that the crystal planes of the exchange bias layers 16 and the free magnetic layer 1 preferentially aligned parallel to the layer surface are crystallographically identical and that particular crystallographically identical crystal axes lying in these crystal planes of the exchange bias layers 16 and the free magnetic layer 1 are oriented in different directions, at least partly. Also, in the spin-valve thin-film element having the above-described transmission electron beam diffraction images, a proper order transformation occurs in the exchange bias layers 16 as a result of heat treatment, and an increased coupling magnetic field compared to the conventional technique can be obtained.

At the two side portions of the free magnetic layer 1, the free magnetic layer 1 is put into a single domain state in the X direction in the drawing by the exchange coupling magnetic field generated between the exchange bias layers 16 and the free magnetic layer 1. The track width (Tw) areas of the free magnetic layer 1 are adequately magnetized in the X direction in the drawing to the extent that the area is sensitive toward an external magnetic field.

Referring to FIG. 4, a nonmagnetic interlayer 2 is formed on the free magnetic layer 1. A pinned magnetic layer 3 is formed on the nonmagnetic interlayer 2. An antiferromagnetic layer 4 is formed on the pinned magnetic layer 3.

In this embodiment, the crystal planes of the antiferromagnetic layer 4 and the pinned magnetic layer 3 preferentially aligned parallel to the layer surface are crystallographically identical after the heat treatment. Also, particular crystallographically identical crystal axes lying in these crystal planes of the antiferromagnetic layer 4 and the pinned magnetic layer 3 are oriented in different directions, at least partly.

In a cross section of the antiferromagnetic layer 4 and the pinned magnetic layer 3 parallel to the layer thickness direction (the Z direction in the drawing), the crystal grain boundaries of the antiferromagnetic layer 4 and those of the pinned magnetic layer 3 are discontinuous at the interface, at least partly.

As a result, at least part of the above interface keeps the lattice-mismatching state, a proper order transformation can be achieved in the antiferromagnetic layer 4 as a result of the heat treatment, and an increased exchange coupling magnetic field can be obtained.

Preferably, the crystal planes of the antiferromagnetic layer 4 and the pinned magnetic layer 3 preferentially aligned parallel to the layer surface are the crystallographically identical planes generically described as the {111} planes. Preferably, the crystallographically identical axes generically described as the <110> axes are oriented in different directions between the antiferromagnetic layer 4 and the pinned magnetic layer 3.

In the spin-valve thin-film element shown in FIG. 4, diffraction spots corresponding to the reciprocal lattice points indicative of crystal planes of the antiferromagnetic layer 4 and the pinned magnetic layer 3 appear in transmission electron beam diffraction diagrams of the antiferromagnetic layer 4 and the pinned magnetic layer 3 using an electron beam entering in a direction parallel to the interface thereof. One diffraction spot which is given the same label and being located in the layer thickness direction when viewed from the beam origin is selected and a first imaginary line connecting the diffraction spot and the beam origin is drawn for each of the diffraction diagrams. The first imaginary line in the diffraction diagram of the pinned magnetic layer 3 and the first imaginary line in the diffraction diagram of the antiferromagnetic layer 4 are coincident with each other.

Moreover, a second imaginary line in the diffraction diagram of the antiferromagnetic layer 4, connecting the beam origin and a diffraction spot indicative of a particular crystal plane and located in a direction other than the layer thickness direction when viewed from the beam origin does not coincide with a second imaginary line drawn in the same manner in the diffraction diagram of the pinned magnetic layer 3. In other cases, the diffraction spot indicative of a certain crystal plane and located in a direction other than the layer thickness direction appears in only one of the diffraction diagrams of the antiferromagnetic layer and ferromagnetic layer.

The diffraction spot located in the layer thickness direction is preferably the one indicating one of the crystallographically identical planes generically described as the {111} planes.

Furthermore, in the spin-valve thin-film element shown in FIG. 4, diffraction spots corresponding to the reciprocal lattice points indicative of the crystal planes of the pinned magnetic layer 3 and the antiferromagnetic layer 4 appear in the transmission electron beam diffraction diagrams obtained using an electron beam entering from a direction perpendicular to the interface between the antiferromagnetic layer 4 and the pinned magnetic layer 3. Among the diffraction spots, one diffraction spot given the same label in the diffraction diagrams of the pinned magnetic layer 3 and the antiferromagnetic layer 4 is selected and a imaginary line connecting the diffraction spot and the beam origin is drawn for each of the diffraction diagrams. The imaginary lines are not coincident with each other at the diffraction diagrams of the pinned magnetic layer 3 and that of the antiferromagnetic layer 4. In other cases, the diffraction spot appears in only one of the diffraction diagrams of the antiferromagnetic layer 4 and the pinned magnetic layer 3.

Preferably, the direction perpendicular to the above-described interface is the direction of the crystallographically identical axes generically described as the <111> axes. Moreover, the crystal planes preferentially aligned parallel to the interface between the antiferromagnetic layer and the ferromagnetic layer are preferably the crystallographically identical planes generically described as the {111} planes.

When the transmission electron beam diagrams as described above are obtained, it can be assumed that the crystal planes of the antiferromagnetic layer 4 and the pinned magnetic layer 3 preferentially aligned parallel to the layer surface are crystallographically identical, and that the particular crystallographically identical crystal axes lying in these crystal planes of the antiferromagnetic layer 4 and the pinned magnetic layer 3 are oriented in different directions, at least partly. Also, in the spin-valve thin-film element having the above-described transmission electron beam diffraction images, a proper order transformation occurs in the antiferromagnetic layer 4 as a result of heat treatment, and an increased coupling magnetic field compared to the conventional technique can be obtained.

Figure 5:
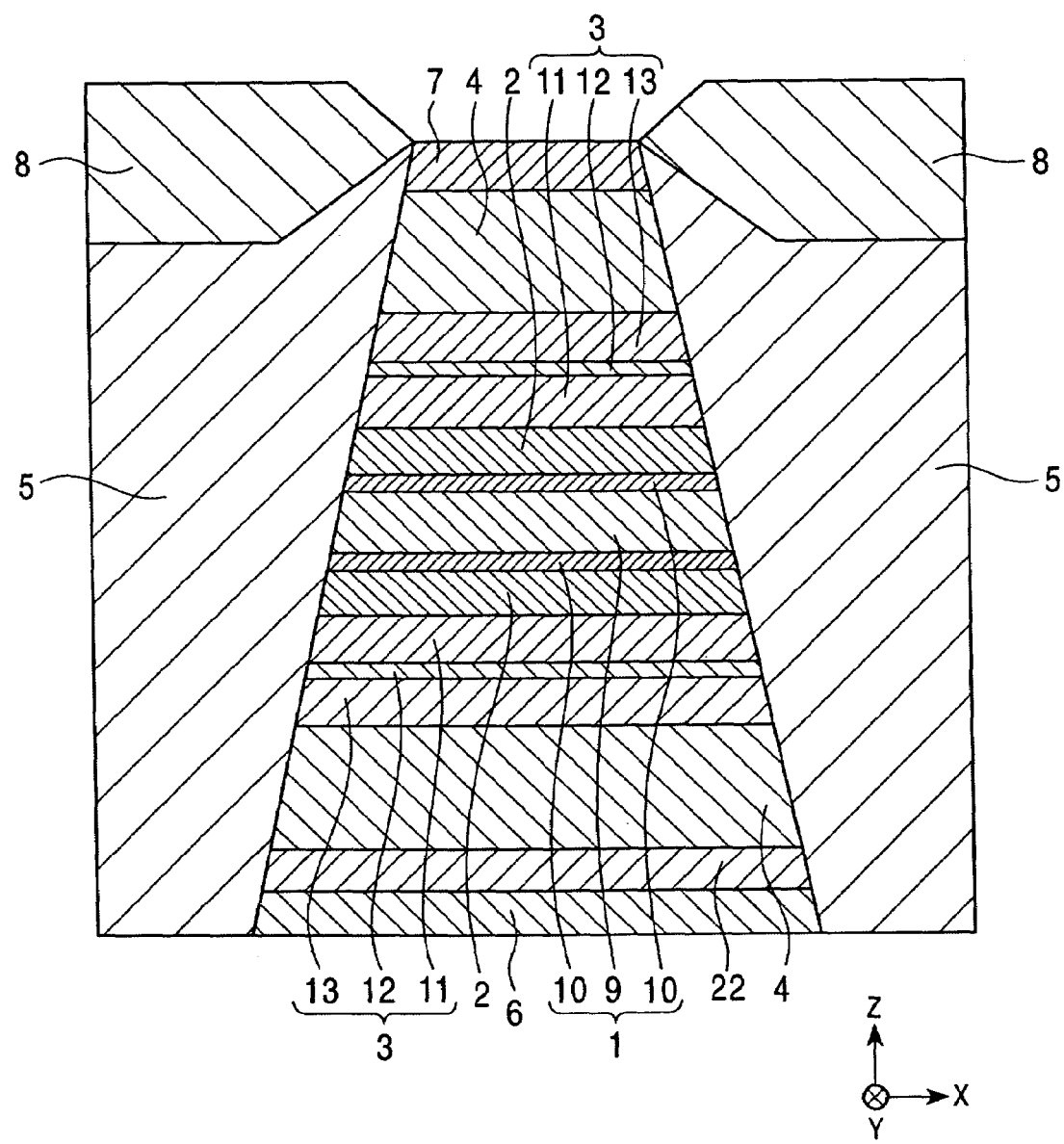
FIG. 5 is a cross-section illustrating the structure of a dual spin-valve magnetoresistive element according to a fifth embodiment of the present invention as viewed from an air bearing surface side.

FIG. 5 is a cross-sectional view showing part of the structure of a dual spin-valve thin-film element according to still another aspect of the present invention.

Referring to FIG. 5, the dual spin-valve thin-film element comprises an underlayer 6, a seed layer 22, an antiferromagnetic layer 4, a pinned magnetic layer 3, a nonmagnetic interlayer 2, and a free magnetic layer 1, deposited in that order from the bottom. The free magnetic layer 1 comprises three layers, namely, Co layers 10 and a NiFe alloy layer 9. A nonmagnetic interlayer 2, a pinned magnetic layer 3, an antiferromagnetic layer 4, and a protective layer 7 are deposited on the free magnetic layer 1.

Hard bias layers 5 and conductive layers 8 are deposited on two sides of the layers from the underlayer 6 to the protective layer 7. Each layers are composed of the same material as in the first embodiment shown in FIG. 1.

In this embodiment, the seed layer 22 is provided under the under the antiferromagnetic layer 4 located below the free magnetic layer 1 in the drawing. The content X or X+X' constituting the antiferromagnetic layer 4 is preferably in the range of 45 to 60 atomic percent, and more preferably in the range of 49 to 56.5 atomic percent.

In this embodiment, the crystal planes of the antiferromagnetic layer 4 and the pinned magnetic layer 3 preferentially aligned parallel to the layer surface are crystallographically identical, and that the particular crystallographically identical crystal axes lying in these crystal planes of the antiferromagnetic layer 4 and the pinned magnetic layer 3 are oriented in different directions, at least partly.

Moreover, in a cross-section of the antiferromagnetic layer 4 and the pinned magnetic layer 3 parallel to the layer thickness direction (the Z direction in the drawing), the crystal grain boundaries of the antiferromagnetic layer 4 and those of the pinned magnetic layer 3 are discontinuous at the interface, at least partly.

As a result, at least part of the interface-keeps the lattice-mismatching state. A proper order transformation occurs in the antiferromagnetic layer 4 as a result of heat treatment and a strong exchange coupling magnetic field can be obtained.

Preferably, the crystal planes of the antiferromagnetic layer 4 and the pinned magnetic layer 3 preferentially aligned parallel to the layer surface are the crystallographically identical planes generically described as the {111} planes. Preferably, the crystallographically identical axes generically described as the <110> axes are oriented in different directions between the antiferromagnetic layer 4 and the pinned magnetic layer 3.

In the dual spin-valve thin-film element of this embodiment shown in FIG. 5, not only the pinned magnetic layer 3 and the antiferromagnetic layer 4 provided below the free magnetic layer 1, but each of the deposited layers has the above-described crystal orientation.

That is, in this embodiment, the crystal planes of the antiferromagnetic layer 4 and the pinned magnetic layer 3 preferentially aligned parallel to the layer surface are crystallographically identical, and that the particular crystallographically identical crystal axes lying in these crystal planes of the antiferromagnetic layer 4 and the pinned magnetic layer 3 are oriented in different directions, at least partly.

Moreover, in a cross-section of the antiferromagnetic layer 4 and the pinned magnetic layer 3 parallel to the layer thickness direction (the Z direction in the drawing), the crystal grain boundaries of the antiferromagnetic layer 4 and those of the pinned magnetic layer 3 are discontinuous at the interface, at least partly.

As a result, at least part of the above interface keeps the lattice-mismatching state, a proper order transformation can be achieved in the antiferromagnetic layer 4 as a result of the heat treatment, and an increased exchange coupling magnetic field can be obtained.

Preferably, the crystal planes of the antiferromagnetic layer 4 and the pinned magnetic layer 3 preferentially aligned parallel to the layer surface are the crystallographically identical planes generically described as the {111} planes. Preferably, the crystallographically identical axes generically described as the <110> axes are oriented in different directions between the antiferromagnetic layer 4 and the pinned magnetic layer 3.

In the spin-valve thin-film element shown in FIG. 5, diffraction spots corresponding to the reciprocal lattice points indicative of crystal planes of the antiferromagnetic layer 4 and the pinned magnetic layer 3 appear in transmission electron beam diffraction diagrams of the antiferromagnetic layer 4 and the pinned magnetic layer 3 using an electron beam entering in a direction parallel to the interface thereof. One diffraction spot which is given the same label and being located in the layer thickness direction when viewed from the beam origin is selected and a first imaginary line connecting the diffraction spot and the beam origin is drawn for each of the diffraction diagrams. The first imaginary line in the diffraction diagram of the pinned magnetic layer 3 and the first imaginary line in the diffraction diagram of the antiferromagnetic layer 4 are coincident with each other.

Moreover, a second imaginary line in the diffraction diagram of the antiferromagnetic layer 4, connecting the beam origin and a diffraction spot indicative of a particular crystal plane and located in a direction other than the layer thickness direction when viewed from the beam origin does not coincide with a second imaginary line drawn in the same manner in the diffraction diagram of the pinned magnetic layer 3. In other cases, the diffraction spot indicative of a certain crystal plane and located in a direction other than the layer thickness direction appears in only one of the diffraction diagrams of the antiferromagnetic layer and ferromagnetic layer.

The diffraction spot located in the layer thickness direction is preferably the one indicating one of the crystallographically identical planes generically described as the {111} planes.

Furthermore, in the spin-valve thin-film element shown in FIG. 5, diffraction spots corresponding to the reciprocal lattice points indicative of the crystal planes of the pinned magnetic layer 3 and the antiferromagnetic layer 4 appear in the transmission electron beam diffraction diagrams obtained using an electron beam entering from a direction perpendicular to the interface between the antiferromagnetic layer 4 and the pinned magnetic layer 3. Among the diffraction spots, one diffraction spot given the same label in the diffraction diagrams of the pinned magnetic layer 3 and the antiferromagnetic layer 4 is selected and a imaginary line connecting the diffraction spot and the beam origin is drawn for each of the diffraction diagrams. The imaginary lines are not coincident with each other at the diffraction diagrams of the pinned magnetic layer 3 and that of the antiferromagnetic layer 4. In other cases, the diffraction spot appears in only one of the diffraction diagrams of the antiferromagnetic layer 4 and the pinned magnetic layer 3.

Preferably, the direction perpendicular to the above-described interface is the direction of the crystallographically identical axes generically described as the <111> axes. Moreover, the crystal planes preferentially aligned parallel to the interface between the antiferromagnetic layer and the ferromagnetic layer are preferably the crystallographically identical planes generically described as the {111} planes.

When the transmission electron beam diagrams as described above are obtained, it can be assumed that the crystal planes of the antiferromagnetic layer 4 and the pinned magnetic layer 3 preferentially aligned parallel to the layer surface are crystallographically identical, and that the particular crystallographically identical crystal axes lying in these crystal planes of the antiferromagnetic layer 4 and the pinned magnetic layer 3 are oriented in different directions, at least partly. Also, in the spin-valve thin-film element having the above-described transmission electron beam diffraction images, a proper order transformation occurs in the antiferromagnetic layer 4 as a result of heat treatment, and an increased coupling magnetic field compared to the conventional technique can be obtained.

Figure 6:
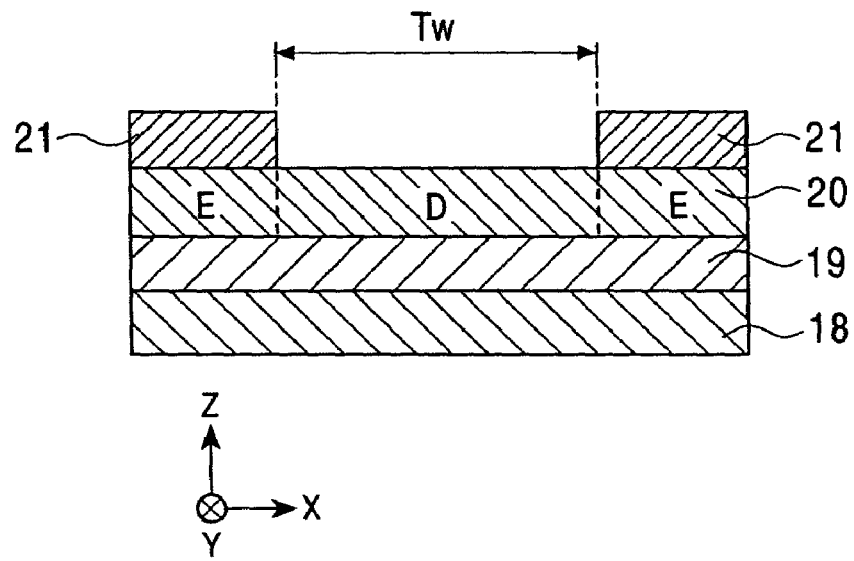
FIG. 6 is a cross-section illustrating the structure of a AMR magnetoresistive element according to a sixth embodiment of the present invention as viewed from an air bearing surface side.

FIG. 6 is a cross-sectional view illustrating the structure of an AMR magnetoresistive element according to a sixth embodiment of the present invention.

The AMR magnetoresistive element comprises a soft magnetic layer (SAL) 18, a nonmagnetic layer (shunt layer) 19, and a magnetoresistive layer 20, deposited in that order from the bottom.

For example, the soft magnetic layer 18 comprises an Fe—Ni—Nb alloy, the nonmagnetic layer 19 comprises tantalum (Ta), and the magnetoresistive layer 20 comprises a NiFe alloy.

Exchange bias layers (antiferromagnetic layers) 21, separated from one another in a track width direction (the X direction in the drawing) with a gap corresponding to the track width Tw therebetween, are formed on the two side portions of the magnetoresistive layer 20. Conductive layers (not shown in the drawing) are formed, for example, on the exchange bias layers 21.

Figure 7:
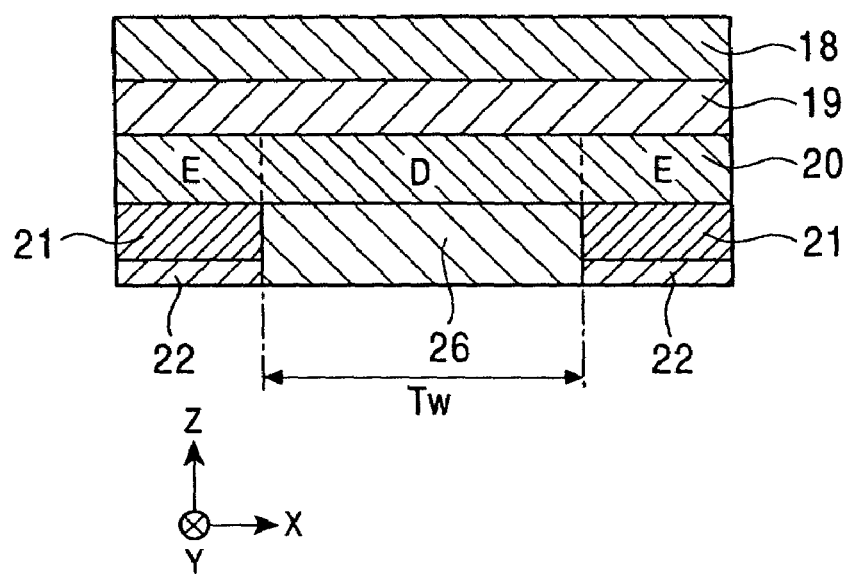
FIG. 7 is a cross-section illustrating the structure of a AMR magnetoresistive element according to a second embodiment of the present invention as viewed from an air bearing surface side.

FIG. 7 is a cross-sectional view illustrating the structure of an AMR magnetoresistive element according to a seventh embodiment of the present invention.

Referring to FIG. 7, a pair of seed layers 22 is formed separated from one another in the track width direction (the X direction in the drawing) with a gap corresponding to a track width Tw therebetween. Exchange bias layers 21 are formed on the seed layers 22. The gap between the seed layers 22 provided with the exchange bias layers 21 thereon is filled with an insulative material such as $SiO_2$ or $Al_2O_3$ so as to form an insulation layer 26.

A magnetoresistive layer (MR layer) 20, a nonmagnetic layer (shunt layer) 19, and a soft magnetic layer (SAL layer) are deposited on the exchange bias layers 21 and the insulation layer 26.

In the embodiments shown in FIGS. 6 and 7, the crystal planes of the exchange bias layers 21 and the magnetoresistive layer 20 preferentially aligned parallel to the layer surface are crystallographically identical, and particular crystallographically identical crystal axes lying in these crystal planes of the exchange bias layers 21 and the magnetoresistive layer 20 are oriented in different directions, at least partly.

Moreover, in a cross-section of the exchange bias layers 21 and the magnetoresistive layer 20 parallel to the layer thickness direction (the Z direction in the drawing), the crystal grain boundaries of the exchange bias layers 21 and those of the magnetoresistive layer 20 are discontinuous at the interface, at least partly.

As a result, at least part of the above interface keeps the lattice-mismatching state, a proper order transformation can be achieved in the exchange bias layers 21 as a result of the heat treatment, and an increased exchange coupling magnetic field can be obtained.

Preferably, the crystal planes of the exchange bias layers 21 and the magnetoresistive layer 20 preferentially aligned parallel to the layer surface are the crystallographically identical planes generically described as the {111} planes. Preferably, the crystallographically identical axes generically described as the <110> axes are oriented in different directions between the exchange bias layers 21 and the magnetoresistive layer 20.

In the AMR thin-film elements shown in FIGS. 6 and 7, diffraction spots corresponding to the reciprocal lattice points indicative of crystal planes of the exchange bias layers 21 and the magnetoresistive layer 20 appear in transmission electron beam diffraction diagrams of the exchange bias layers 21 and the magnetoresistive layer 20 using an electron beam entering in a direction parallel to the interface thereof. One diffraction spot which is given the same label and being located in the layer thickness direction when viewed from the beam origin is selected and a first imaginary line connecting the diffraction spot and the beam origin is drawn for each of the diffraction diagrams. The first imaginary line in the diffraction diagram of the antiferromagnetic layer and the first imaginary line in the diffraction diagram of the ferromagnetic layer are coincident with each other.

Moreover, a second imaginary line in the diffraction diagram of the antiferromagnetic layer, the line connecting the beam origin and a diffraction spot indicative of a particular crystal plane and located in a direction other than the layer thickness direction when viewed from the beam origin, does not coincide with a second imaginary line drawn in the same manner in the diffraction diagram of the ferromagnetic layer. In other cases, the diffraction spot indicative of a certain crystal plane and located in a direction other than the layer thickness direction appears in only one of the diffraction diagrams of the antiferromagnetic layer and ferromagnetic layer.

The diffraction spot located in the layer thickness direction is preferably the one indicating one of the crystallographically identical planes generically described as the {111} planes.

Furthermore, in the AMR thin-film elements shown in FIGS. 6 and 7, diffraction spots corresponding to the reciprocal lattice points indicative of the crystal planes of the exchange bias layers 21 and the magnetoresistive layer 20 appear in the transmission electron beam diffraction diagrams obtained using an electron beam entering from a direction perpendicular to the above-described interface. Among the diffraction spots, one diffraction spot given the same label in the diffraction diagrams of exchange bias layers 21 and the magnetoresistive layer 20 is selected and a imaginary line connecting the diffraction spot and the beam origin is drawn for each of the diffraction diagrams. The imaginary lines are not coincident with each other at the diffraction diagrams of the exchange bias layers 21 and that of the magnetoresistive layer 20. In other cases, the diffraction spot appears in only one of the diffraction diagrams of the exchange bias layers 21 and the magnetoresistive layer 20.

Preferably, the direction perpendicular to the above-described interface is the direction of the crystallographically identical axes generically described as the <111> axes. Moreover, the crystal planes preferentially aligned parallel to the interface between the antiferromagnetic layer and the ferromagnetic layer are preferably the crystallographically identical planes generically described as the {111} planes.

When the transmission electron beam diagrams as described above are obtained, it can be assumed that the crystal planes of the exchange bias layers 21 and the magnetoresistive layer 20 preferentially aligned parallel to the layer surface are crystallographically identical, and that the particular crystallographically identical crystal axes lying in these crystal planes of the exchange bias layers 21 and the magnetoresistive layer 20 are oriented in different directions, at least partly. Moreover, a proper order transformation occurs in the exchange bias layers 21 as a result of heat treatment, and an increased coupling magnetic field compared to the conventional technique can be obtained.

In each of the AMR thin-film elements shown in FIGS. 6 and 7, an exchange coupling magnetic field generated at the interface between the exchange bias layers 21 and the magnetoresistive layer 20 puts the areas E of the magnetoresistive layer 20 into a single-domain state in the X direction in the drawings. As a result, the magnetization vector in the area D of the magnetoresistive layer 20 is oriented in the X direction in the drawings. The galvanomagnetism generated when sense current flows into the magnetoresistive layer 20 is applied to the soft magnetic layer 18 in the Y direction in the drawings. By the magnetostatic coupling energy yielded by the soft magnetic layer 18, a lateral bias magnetic field is applied to the area D of the magnetoresistive layer 20 in the Y direction. When the lateral bias magnetic field is applied to the D area of the magnetoresistive layer 20 being put into a single-domain state in the X direction, the area D of the magnetoresistive layer 20 achieves a linear change in resistance in response to changes in magnetic fields (magnetoresistive characteristics: H-R characteristics).

A recording medium moves in the Z direction in the drawing. When a leakage magnetic field is applied in the Y direction in the drawing, the resistance in the D area of the magnetoresistive layer 20 changes and this change is detected as the change in voltage.

Regarding the method for making the magnetoresistive elements shown in FIGS. 1 to 7, the antiferromagnetic layer 4 thereof is preferably made as follows.

As described earlier, the content of X or total content of X and X' in the antiferromagnetic layer 4 is preferably in the range of 45 to 60 atomic percent, and more preferably in the range of 49 to 56.5 atomic percent. In this manner, an increased exchange coupling magnetic field can be achieved as shown in the experimental results described below.

Accordingly, one method for making the magnetoresistive head of the present invention comprises depositing the antiferromagnetic layer 4 of the above composition, depositing the rest of the layers, and performing a thermal treatment.

Each of the interface between the antiferromagnetic layer 4 and the pinned magnetic layer 3, the interface between the exchange bias layers 16 and the free magnetic layer 1, the interface between exchange bias layers 21 and the magnetoresistive layer 20, the interface between the seed layer 22 and the antiferromagnetic layer 4 in case the seed layer 22 is formed, is preferably in a lattice-mismatching state at least partly subsequent to the thermal treatment. The lattice-mismatching state is preferably achieved during the layer deposition step. When these interfaces are in a lattice-matching state during the deposition step, the antiferromagnetic layer 4 does not properly transform into an ordered lattice even after the thermal treatment.

In order to keep these interfaces in a lattice-mismatching state during the deposition step, it is preferable that the antiferromagnetic layer 4 and other layers be deposited as follows.

Figure 8:
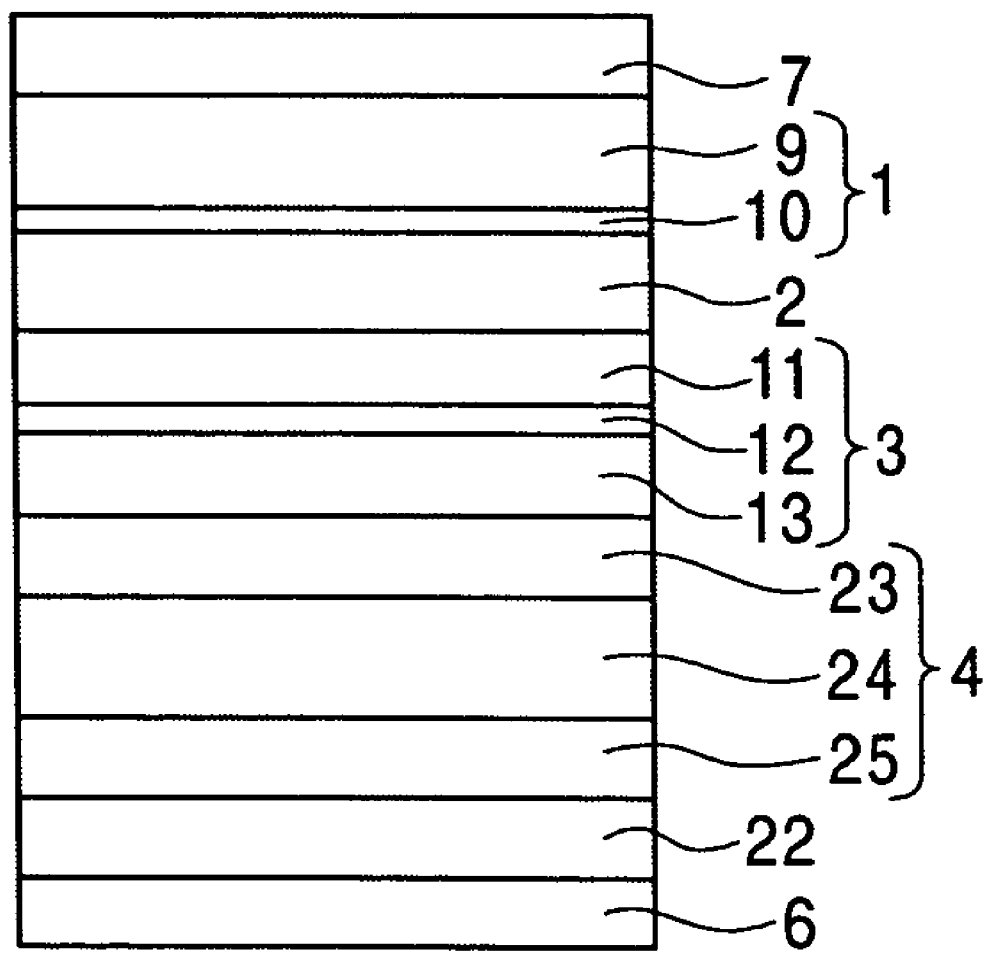
FIG. 8 illustrates the magnetoresistive element shown in FIG. 1 in its as-deposited state.

FIG. 8 illustrates the layers in as-deposited state. The layers correspond to those in FIG. 1. As shown in FIG. 8, after the underlayer is deposited on a seed layer 22, an antiferromagnetic layer 4 comprising three layers is deposited. A first antiferromagnetic layer 23, a second antiferromagnetic layer 24, and a third antiferromagnetic layer 25 which constitute the antiferromagnetic layer 4 are formed of an X—Mn alloy or an X—Mn—X' alloy.

During the step of deposition, the content X or X+X' in the first antiferromagnetic layer 23 and the third antiferromagnetic layer 25 is set larger than the content X or X+X' contained in the second antiferromagnetic layer 24.

The second antiferromagnetic layer 24 formed between the first antiferromagnetic layer 23 and the third antiferromagnetic layer 25 is formed of an antiferromagnetic material of the type most suitable for yielding transformations from a disordered lattice to a ordered lattice as a result of heat treatment.

When the content of X or X+X' contained in the first antiferromagnetic layer 23 and the third antiferromagnetic layer 25 is set larger than the content X or X+X' contained in the second antiferromagnetic layer 24, the disordered lattice of the antiferromagnetic layer 4 readily transforms into an ordered lattice through a thermal treatment. This is because, the antiferromagnetic layer is not restrained by the crystal structure, etc., of the pinned magnetic layer 3 or the seed layer 22.

The content X or the total content of X and X' in the first antiferromagnetic layer 23 and the third antiferromagnetic layer 25 is preferably in the range of 53 to 65 atomic percent, and more preferably in the range of 55 t 60 atomic percent. The thickness of the first antiferromagnetic layer 23 and the third antiferromagnetic layer 25 is preferably in the range of 3 to 30 angstroms, respectively. For example, in FIG. 8, the thickness of the first and third antiferromagnetic layers 23 and 25 is approximately 10 angstroms.

The content X or the total content of X and X' in the second antiferromagnetic layer 24 is in the range of 44 to 57 atomic percent, preferably in the range of 46 to 55 atomic percent. In this manner, the disorder lattice of the second antiferromagnetic layer 24 is readily transformed in to an ordered lattice as a result of heat treatment. The thickness of the second antiferromagnetic layer 24 is preferably 70 angstroms or more. In the embodiment shown in FIG. 8, the thickness of the second antiferromagnetic layer 24 is approximately 100 angstroms.

The first, second, and third antiferromagnetic layers 23, 24, and 25 are preferably made by a sputtering method. It is preferable that the pressure of the sputter gas used in making the first antiferromagnetic layer 23 and the third antiferromagnetic layer 25 be lower than that used in making the second antiferromagnetic layer 24. In this manner, The content X or the total content of X and X' in the second antiferromagnetic layer 24 and the third antiferromagnetic layer 25 can be made larger than that of the second antiferromagnetic layer 24.

Alternatively, the antiferromagnetic layer 4 in as-deposited state (before heat treatment) can be formed of one layer instead of three layers as described above. In this case, it is also possible to properly change the content of X or X+X' along the layer thickness direction by the process described below.

First, in the course of making the antiferromagnetic layer 4 by sputtering using a target formed of an antiferromagnetic material containing X and Mn or X, X', and Mn, the pressure of the sputter gas is gradually elevated as the deposition proceeds. Once approximately one half of the antiferromagnetic layer 4 is deposited, the pressure of the sputter gas is gradually reduced so as to deposit the rest of the antiferromagnetic layer 4.

In this manner, the content of X or X+X' is gradually decreased from the interface with the seed layer 22 toward the center portion of the antiferromagnetic layer 4 in the layer thickness direction and is gradually increased from the center portion toward the interface with the pinned magnetic layer 3.

Accordingly, the content of X or X+X' in the antiferromagnetic layer 4 is high at the interfaces between the antiferromagnetic layer 4 and the seed layer 22, and between the antiferromagnetic layer 4 and the pinned magnetic layer 3, and is low at the center portion of the antiferromagnetic layer 4 in layer thickness direction.

Preferably, in the portions contacting the pinned magnetic layer 3 and the interface between the seed layer 22, the X or X+X' content in the antiferromagnetic layer 4 is in the range of 53 to 65 atomic percent, and more preferably in the range of 55 to 60 atomic percent of the all elements constituting the antiferromagnetic layer 4.

Preferably, in the center portion of the antiferromagnetic layer 4 in the layer thickness direction, the X or X+X' content is in the range of 44 to 57 atomic percent, and more preferably in the range of 46 to 55 atomic percent. The thickness of the antiferromagnetic layer 4 is preferably 76 angstroms or more.

Figure 9:
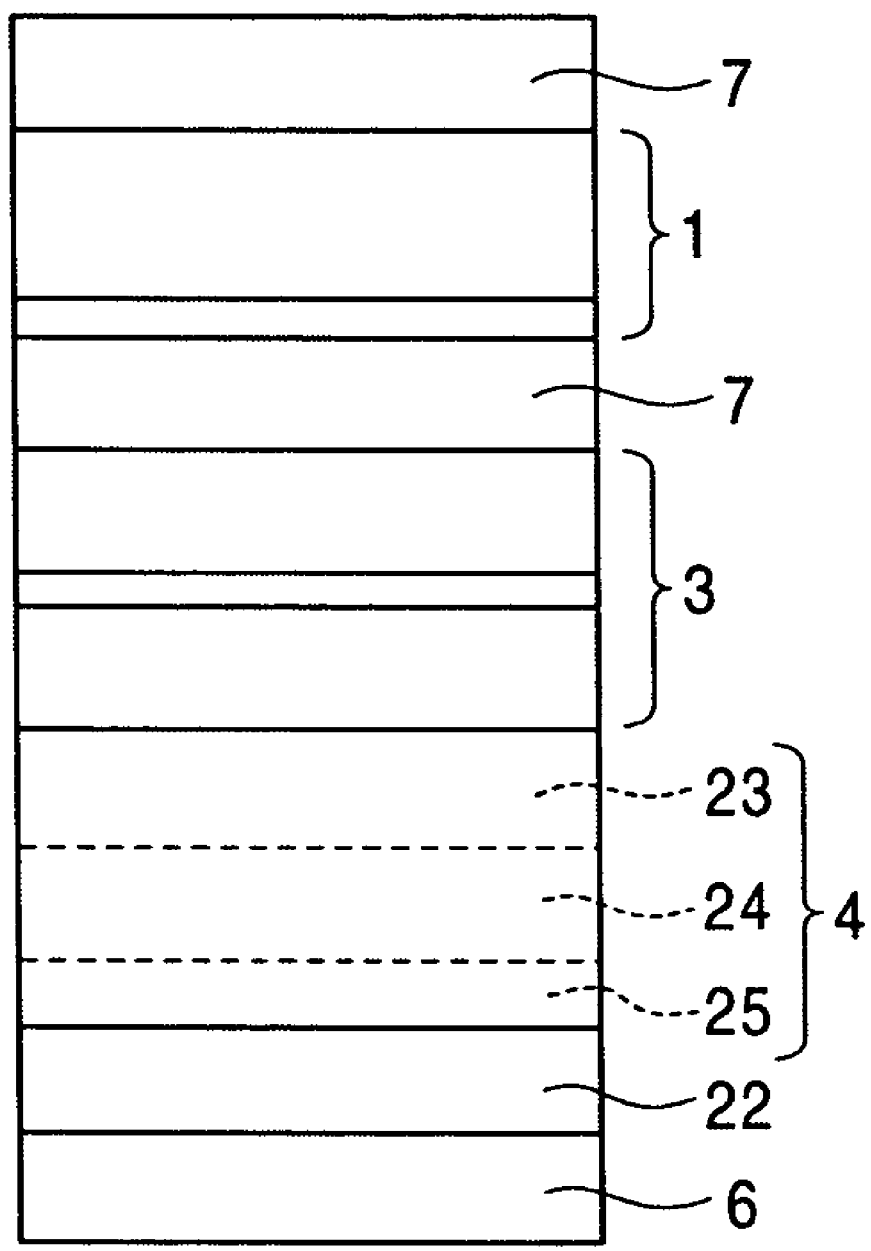
FIG. 9 illustrates the structures of the layers after a heat treatment of the magnetoresistive element shown in FIG. 8.

FIG. 9 is a illustration of the spin-valve thin-film element showing the state of the layers after the heat treatment.

Here, the first antiferromagnetic layer 23 and the third antiferromagnetic layer 25 having a higher X or X+X' content are in contact with the pinned magnetic layer and the seed layer 22, and the second antiferromagnetic layer 24 having a composition readily transformable from an disordered lattice to an ordered lattice through heat treatment is provided between the first antiferromagnetic layer 23 and the third antiferromagnetic layer 25. During the heat treatment, the transformation proceeds in the second antiferromagnetic layer 24 while diffusion of elements occurs at the interfaces between the second antiferromagnetic layer 24 and the first antiferromagnetic layer 23, and between the second antiferromagnetic layer 24 and the third antiferromagnetic layer 25. As a result, a desirable lattice-mismatching state can be maintained at the interfaces between the first antiferromagnetic layer 23 and the pinned magnetic layer 3, and between the third antiferromagnetic layer 25 and the seed layer 22, the disordered lattice is transformed into an ordered lattice, and the entire antiferromagnetic layer 4 can be properly transformed into an ordered lattice structure.

In the spin-valve thin-film element after the heat treatment, the same crystallographically identical crystal planes are preferentially oriented parallel to the layer surface at the antiferromagnetic layer 4 and the pinned magnetic layer 3. Moreover, the same crystallographically identical crystal axes lying in the above-described planes are oriented in different directions between the antiferromagnetic layer 4 and the pinned magnetic layer 3, at least partly.

When a cross section of the antiferromagnetic layer 4 and the pinned magnetic layer 3 cut parallel to the layer thickness direction (the Z direction in the drawing) is examined, the crystal grain boundaries of the antiferromagnetic layer 4 and those of the pinned magnetic layer 3 are discontinuous at the interface thereof, at least partly.

It should be noted that in the antiferromagnetic layer 4 after the heat treatment, there are regions towards the seed layer 22 and the pinned magnetic layer 3 having an increased X or X+X' content relative to Mn.

In the case of making the spin-valve thin-film element shown in FIG. 2, the antiferromagnetic layer 4 may alternatively be composed of two layers, namely, the first antiferromagnetic layer 23 in contact with the pinned magnetic layer 3 and the second antiferromagnetic layer 24 in contact with the protective layer 7, instead of three layers as described above. This is allowable because in this spin-valve thin-film element, the seed layer 22 is not provided as in the first embodiment of FIG. 1.

When the antiferromagnetic layer 4 is composed of two layers, the content X or X+X' relative to Mn is gradually increased towards the interface with the pinned magnetic layer 3.

In the spin-valve thin-film element of FIG. 3, each of the exchange bias layers 16 is formed as two layers as in the case of FIG. 2. The first antiferromagnetic layer 23 is put into contact with the free magnetic layer 1. The second antiferromagnetic layer 24 is formed so as not to contact the free magnetic layer 1.

The antiferromagnetic layer 4 of the spin-valve thin-film element in FIG. 3 is formed as three layers as in the case of the element in FIG. 1. Through thermal treatment, a proper transformation occurs in the exchange bias layers 16 and the antiferromagnetic layer 4, and an increased exchange coupling magnetic field can be generated.

In the exchange bias layer 16 after the heat treatment, there is a region with an increased X or X+X' content in terms atomic percent relative to Mn towards the free magnetic layer 1.

In the antiferromagnetic layer 4 after the heat treatment, there are regions with an increased X or X+X' content in terms of atomic percent relative to Mn towards the pinned magnetic layer 3 and the seed layer 22.

Regarding a method for manufacturing the spin-valve thin-film element shown in FIG. 4, the antiferromagnetic layer 4 is formed as two layers as in FIG. 2. The first antiferromagnetic layer 23 is provided in contact with the pinned magnetic layer 3 and the 24 is formed so as not to contact the pinned magnetic layer 3.

Each of the exchange bias layers 16 are formed as three layers as in the antiferromagnetic layer 4 of the FIG. 1. Through the thermal treatment, a proper order transformation occurs at the exchange bias layers 16 and the antiferromagnetic layer 4, and an increased exchange coupling magnetic field can be generated.

In each of the exchange bias layers 16 after the heat treatment, there are regions with an increased X or X+X' content in terms of atomic percent relative to Mn towards the free magnetic 1 and the seed layer 22.

In the antiferromagnetic layer 4 after the heat treatment, there is a region with an increased X or X+X' content in terms of atomic percent relative to Mn towards the pinned magnetic layer 3.

Regarding a method for making the dual spin-valve thin-film element shown in FIG. 5, the antiferromagnetic layer 4 disposed below the free magnetic layer 1 is formed as three layers, namely, the first antiferromagnetic layer 23 and the second antiferromagnetic layer 24, and the third antiferromagnetic layer 25. The antiferromagnetic layer 4 disposed above the free magnetic layer 1 is formed as two layers, namely, a first antiferromagnetic layer 14 and a second antiferromagnetic layer 15.

The thickness and the composition of each of the first antiferromagnetic layers 14 and 23 and the second antiferromagnetic layers 24, and the third antiferromagnetic layer 25 are the same as the description made regarding to FIG. 1.

Figure 10:
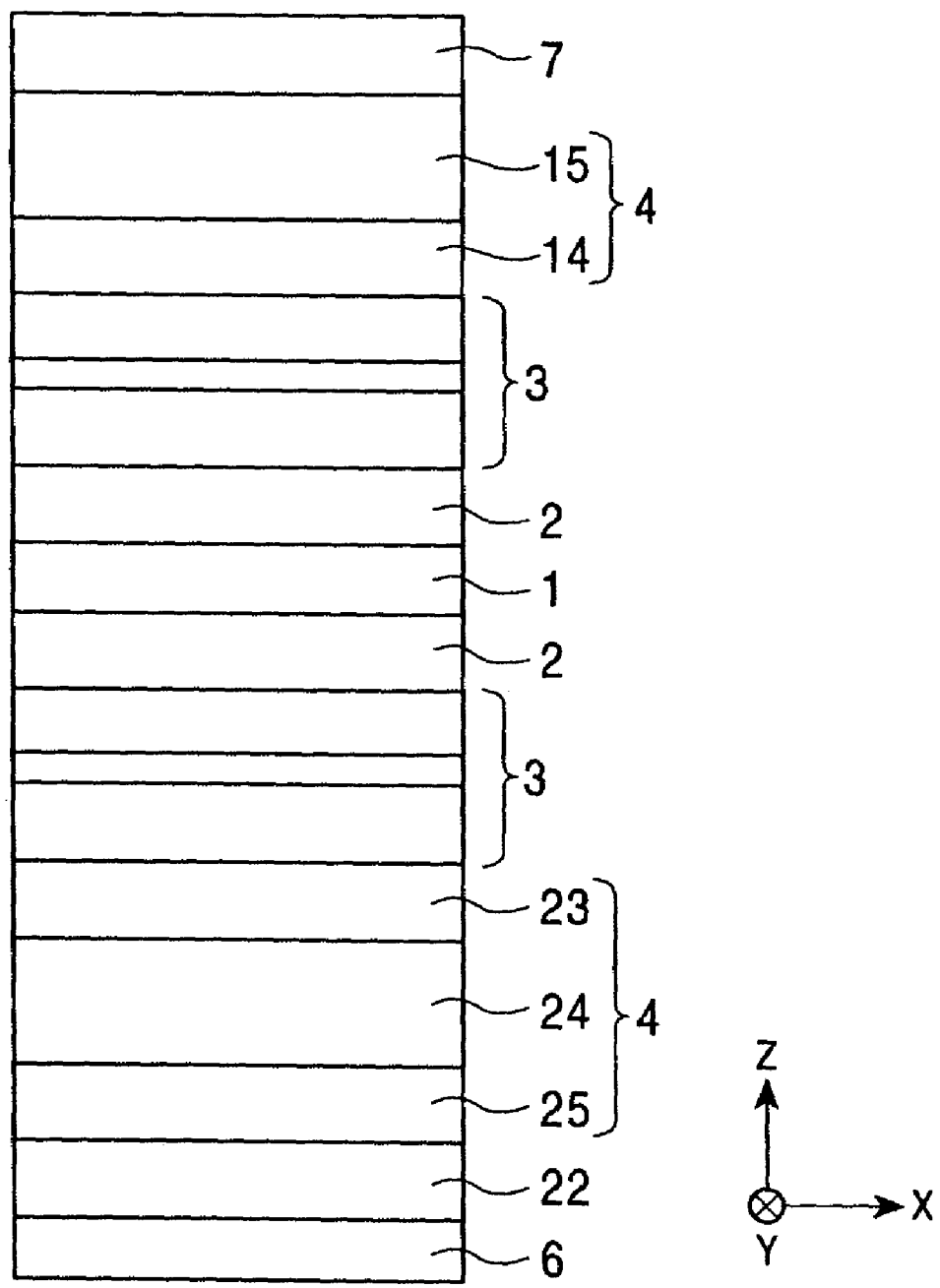
FIG. 10 illustrates the magnetoresistive element shown in FIG. 5 in its as-deposited state.
Figure 11:
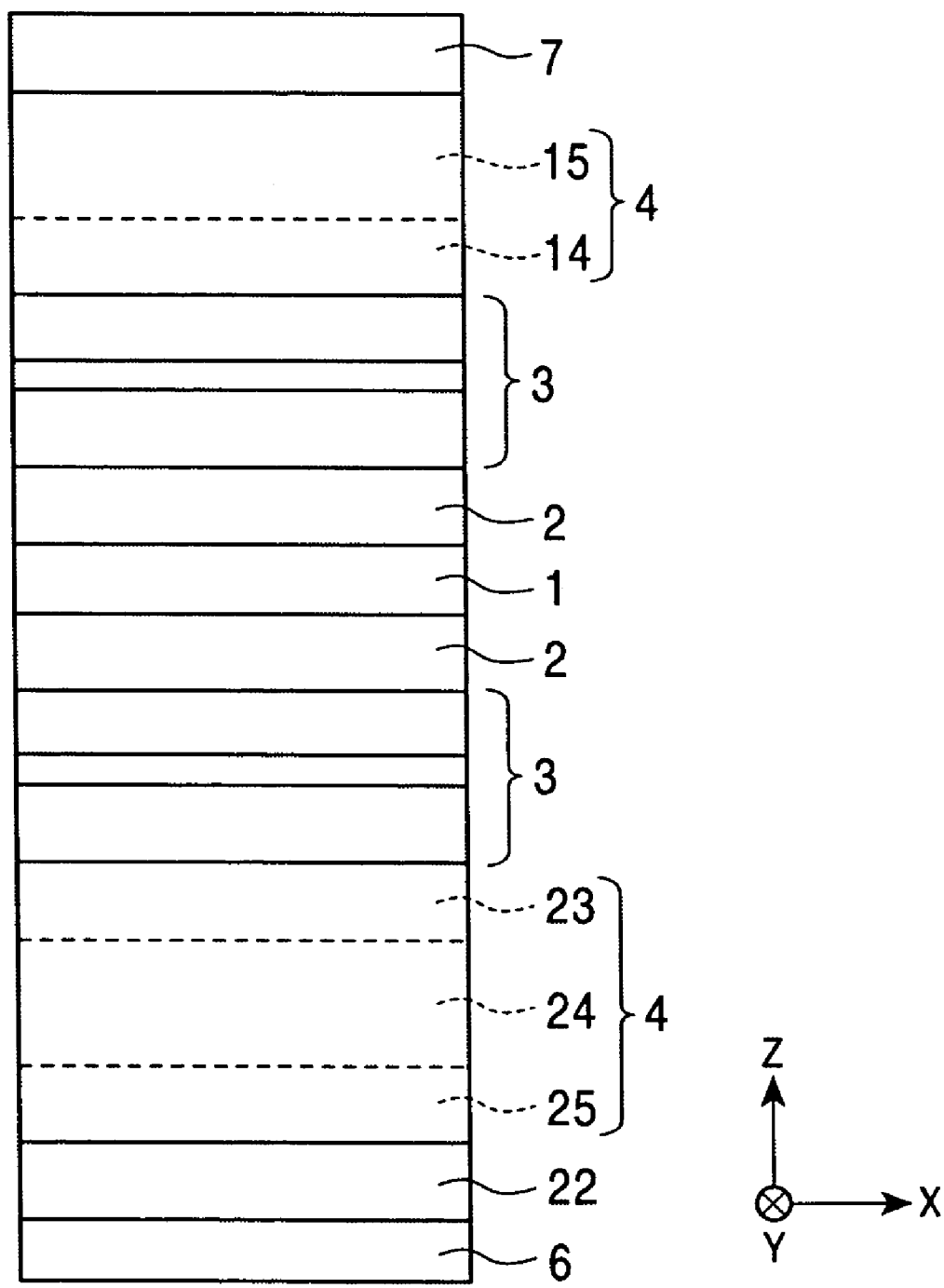
FIG. 11 illustrates the structures of the layers after a heat treatment of the magnetoresistive element shown in FIG. 10.

After the layers are deposited as in FIG. 10, a heat treatment is performed. The layers after the heat treatment are shown in FIG. 11. In FIG. 11, diffusion of elements occurs among the three layers constituting the antiferromagnetic layer 4, and there are regions having an increased X or X+X' content in terms of atomic percent relative to Mn towards the pinned magnetic layer 3 and the seed layer 22.

Diffusion of elements also occurs between the two layers constituting the antiferromagnetic layer 4 formed above the free magnetic layer 1. In the antiferromagnetic layer 4 after the heat treatment, there is a region with an increased X or X+X' content in terms of atomic percent relative to Mn toward the pinned magnetic layer 3.

Regarding a method for making the AMR thin-film element shown in FIG. 6, each of the exchange bias layers 21 is formed as two layers as in the antiferromagnetic layer 4 located above the free magnetic layer 1 shown in FIG. 10. Each of the exchange bias layers 21 comprises the first antiferromagnetic layer 14 in contact with a magnetoresistive layer 20, and the second antiferromagnetic layer 15 is formed so as not to contact the magnetoresistive layer 20.

In the course of the heat treatment, a proper order transformation occurs in the exchange bias layers 21, thereby generating an increased exchange coupling magnetic field at the interfaces between the magnetoresistive layer 20 and the exchange bias layers 21.

In each of the exchange bias layers 21 after the heat treatment, there is a region having an increased X or X+X' content in terms atomic percent relative to Mn towards the magnetoresistive layer 20.

Regarding a method for making the AMR thin-film element shown in FIG. 7, each of the exchange bias layers 21 is composed of three layers as in the antiferromagnetic layer 4 shown in FIG. 8. The exchange bias layer 21 comprises the first antiferromagnetic layer 23 in contact with the magnetoresistive layer 20, the third antiferromagnetic layer 25 in contact with the seed layer 22, and the second antiferromagnetic layer 24 provided between the first antiferromagnetic layer 23 and the third antiferromagnetic layer 25.

Through the heat treatment, a proper order transformation occurs in the exchange bias layers 21, and an increased exchange coupling magnetic field is generated between the magnetoresistive layer 20 and the exchange bias layers 21.

In the exchange bias layer 21 after the heat treatment, there are regions with an increased X or X+X' content in terms of atomic percent relative to Mn towards the magnetoresistive layer 20 and the seed layer 22.

Figure 12:
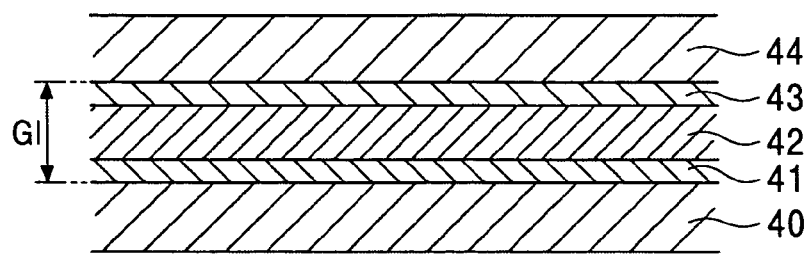
FIG. 12 is a cross-sectional view showing the structure of a thin-film magnetic head (read head) according to the present invention.

FIG. 12 is a cross-section showing the structure of a read head incorporating one of the magnetoresistive elements shown in FIGS. 1 to 11 as viewed from the side facing a recording medium.

The bottom most layer in the drawing is a lower shield layer 40 comprising a NiFe alloy or the like. A lower gap layer 41 is formed on the lower shield layer 40. A magnetoresistive element 42 according to one of FIGS. 1 to 7 is provided on the lower gap layer 41. An upper gap layer 43 is provided on the magnetoresistive element 42, and an upper shield layer 44 comprising a NiFe alloy or the like is provided on the upper gap layer 43.

The lower gap layer 41 and the upper gap layer 43 are composed of an insulative material such as $SiO_2$, $Al_2O_3$ (alumina) or the like. As shown in FIG. 12, a gap length (Gl) is defined as the length from the lower surface of the lower gap layer 41 to the upper surface of the upper gap layer 43. The element having a smaller gap length Gl is capable of meeting the demand for higher recording density.

According to the present invention, an increased exchange coupling magnetic field can still be generated even when the thickness of the antiferromagnetic layer 4 is reduced. As a result, the thickness of the magnetoresistive element can be reduced compared to the conventional ones and it becomes possible to manufacture thin-film magnetic heads having a reduced gap length capable of meeting the demand for higher recording density.

Although the antiferromagnetic layer 4, the exchange bias layers 16, and the magnetoresistive layer 20 shown in FIGS. 1, 3, 4, 5, and 7 are respectively provided with the seed layer 22 thereunder, the scope of the invention is not limited to these.

Moreover, when the crystal grain boundaries of the antiferromagnetic layer and those of the ferromagnetic layer are discontinuous in at least part of the interface thereof as observed in the cross section cut parallel to the layer thickness, the crystal plane of the antiferromagnetic layer preferentially aligned parallel to the layer surface may be different from the crystal plane of the ferromagnetic layer preferentially aligned parallel to the layer surface. In this case also, a proper order transformation occurs in the antiferromagnetic layer through heat treatment and an increased exchange coupling magnetic field can be generated.

EXAMPLE

A spin-valve film having the layer configurations described below was made. The content of Pt contained in a PtMn alloy layer constituting an antiferromagnetic layer is changed so as to examine the relationship between the Pt content and the exchange coupling magnetic field (Hex).

The spin-valve film included, from the bottom: a Si substrate; an alumina layer; a Ta underlayer 3 nm in thickness; a NiFe seed layer 3 nm in thickness; a $Pt_xMn_{100-x}$ antiferromagnetic layer 15 nm in thickness; a pinned magnetic layer composed of a Co layer 1.5 nm in thickness, a Ru layer 0.8 nm in thickness, and a Co layer 2.5 nm in thickness; a Cu nonmagnetic interlayer 2.3 nm in thickness; a free magnetic layer composed of a Co layer 1 nm in thickness and a NiFe layer 3 nm in thickness; a Cu back layer 1.5 nm in thickness; and a Ta protective layer 3 nm in thickness.

Subsequent to the deposition of the layers of the spin-valve film, the deposited layers were heat-treated at a temperature of 200° C. or more for 2 hours of more. The exchange coupling magnetic field was then measured. The results are shown in FIG. 13.

Figure 13:
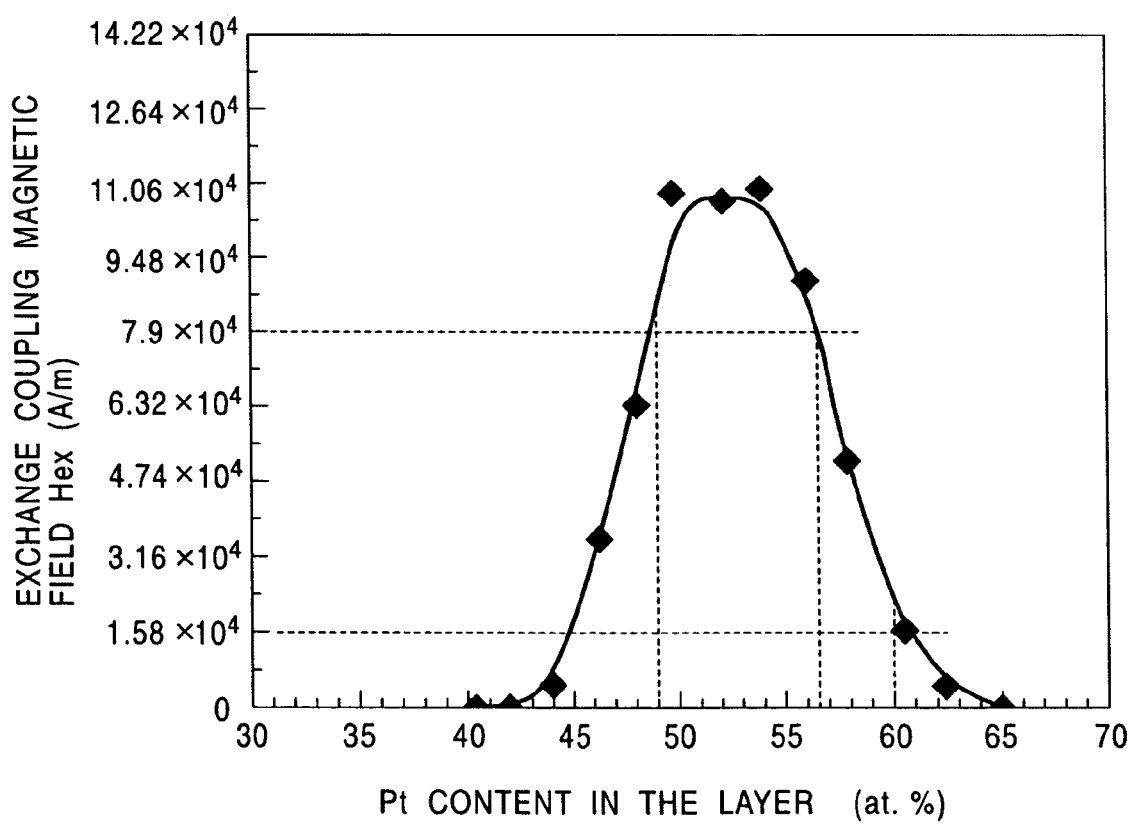
FIG. 13 is a graph showing the relationship between the Pt content in an antiferromagnetic layer (PtMn alloy layer) and an exchange coupling magnetic field (Hex)

As shown in FIG. 13, the exchange coupling magnetic field (Hex) increased as the Pt content X was increased to approximately 50 to 55 atomic percent. When the Pt content exceeded approximately 55 atomic percent, the exchange coupling magnetic field was gradually decreased.

In this invention, a preferable Pt content was defined as the content generating an exchange coupling magnetic field of $1.58 \times 10^4$ (A/m) or more. From the results shown in FIG. 13, the preferable range of Pt content was determined to be between 45 atomic percent and 60 atomic percent.

In this invention, a further preferable Pt content was defined as the content generating an exchange coupling magnetic field of $7.9 \times 10^4$ (A/m) or more. From the results shown in FIG. 13, the further preferable range of Pt content was determined to be between 49 atomic percent and 56.5 atomic percent.

The intensity of the exchange coupling magnetic field changes in relation with the Pt content since the conditions in the interfaces between the antiferromagnetic layer and the ferromagnetic layer (pinned magnetic layer) are changed by changing the Pt content.

The lattice constant of the antiferromagnetic layer is increased as the Pt content is increased. In this respect, by increasing the amount of Pt, the difference in lattice constant between the antiferromagnetic layer and the ferromagnetic layer can be increased, and the interface between the antiferromagnetic layer and the ferromagnetic layer can more readily enter a lattice-mismatching state.

Meanwhile, by providing a seed layer under the antiferromagnetic layer as above, the {111} planes in the each of the layers deposited on the seed layer, namely the {111} planes in the antiferromagnetic layer, can be more easily preferentially aligned parallel to the layer surface.

The amount of Pt should not be excessive. When the Pt content is excessive, a proper order transformation cannot be achieved in the antiferromagnetic layer even when the heat treatment is performed.

In this invention, the antiferromagnetic layer after the heat treatment achieves a proper order transformation while maintaining the lattice-mismatching state in the interface with the antiferromagnetic layer as a result of providing the seed layer under the antiferromagnetic layer and optimizing the Pt content in the antiferromagnetic layer. After the heat treatment, the crystal planes of the antiferromagnetic layer and the ferromagnetic layer preferentially aligned parallel to the layer surface are crystallographically identical and the crystallographically identical axes lying in these crystal planes are oriented, at least partly, in different directions between the antiferromagnetic layer and the ferromagnetic layer.

When a cross-section of the antiferromagnetic layer and the ferromagnetic layer parallel to the layer thickness is examined, the crystal boundaries of the antiferromagnetic layer and the crystal boundaries of the ferromagnetic layer are, at least partly, discontinuous at the interface between the antiferromagnetic layer and the ferromagnetic layer.

As is apparent from the detailed description above, in the exchange coupling film of the present invention, the crystal planes aligned parallel to the interface between the antiferromagnetic layer and the ferromagnetic layer are crystallographically identical. Moreover, the crystal axes lying in these planes are oriented, at least partly, in different directions between the antiferromagnetic layer and the ferromagnetic layer.

In the present invention, the seed layer is preferably provided under the antiferromagnetic layer. In this manner, it becomes easy to preferentially align the same crystal plane parallel to the layer surface in each of the antiferromagnetic layer and ferromagnetic layer formed above the seed layer. When the same crystal plane is preferentially aligned in each of the antiferromagnetic layer and the ferromagnetic layer, the rate of change in resistance can be increased.

The exchange coupling film of the present invention can be incorporated in various types of magnetoresistive elements. A magnetoresistive element comprising the exchange coupling film is capable of meeting the trends toward higher recording density.

What is claimed is:

1. An exchange coupling film comprising an antiferromagnetic layer and a ferromagnetic layer in contact with the antiferromagnetic layer, an exchange coupling magnetic field generated at the interface between the antiferromagnetic layer and the ferromagnetic layer magnetizing the ferromagnetic layer in a particular direction,
wherein diffraction spots corresponding to reciprocal lattice points indicative of crystal planes of the antiferromagnetic layer and the ferromagnetic layer appear in transmission electron beam diffraction diagrams of the antiferromagnetic layer and the ferromagnetic layer obtained using an electron beam in a direction perpendicular to the interface, and
wherein an imaginary line in the diffraction diagram of the antiferromagnetic layer connecting a beam origin and a diffraction spot given a particular label and an imaginary line in the diffraction diagram of the ferromagnetic layer connecting the beam origin and a diffraction spot given the same label are not coincident with each other.

2. An exchange coupling film according to claim 1, wherein the direction perpendicular to the interface is the direction of the crystallographically identical crystal axes generically described as the <111> axes.

3. An exchange coupling film according to claim 1, wherein the antiferromagnetic layer and the ferromagnetic layer have the crystallographically identical planes generically described as the {111} planes, one of which is preferentially aligned parallel to the interface between the antiferromagnetic layer and the ferromagnetic layer.

4. An exchange coupling film according to claim 1, wherein the antiferromagnetic layer and the ferromagnetic layer are deposited in that order from the bottom,
the exchange coupling film further comprising a seed layer provided below the antiferromagnetic layer, the seed layer mainly having a face-centered cubic structure and having crystallographically identical planes generically described as the {111} planes, one of which is preferentially aligned parallel to the interface.

5. An exchange coupling film according to claim 4, the seed layer comprising one of a NiFe alloy and a Ni—Fe—Y alloy, wherein Y is at least one element selected from the group consisting of Cr, Rh, Ta, Hf, Nb, Zr, and Ti.

6. An exchange coupling film according to claim 4, wherein the seed layer is nonmagnetic at room temperature.

7. An exchange coupling film according to claim 4, further comprising an underlayer provided under the seed layer, the underlayer comprising at least one element selected from the group consisting of Ta, Hf, Nb, Zr, Ti, Mo, and W.

8. An exchange coupling film according to claim 4, wherein at least part of the interface between the antiferromagnetic layer and the seed layer is in a lattice-mismatching state.

9. An exchange coupling film according to claim 1, the antiferromagnetic material further comprising X', wherein X' is at least one element selected from the group consisting of Ne, Ar, Kr, Xe, Be, B, C, N, Mg, Al, Si, P, Ti, V, Cr, Fe, Go, Ni, Cu, Zn, Ga, Ge, Zr, Nb, Mo, Ag, Cd, Sn, Ht Ta, W, Re, Au, Pb, and rare earth elements.

10. An exchange coupling film according to claim 9, wherein the antiferromagnetic material is an interstitial solid solution in which X' is inserted to interstices in the lattice formed by X and Mn or a substitutional solid solution in which X' partly displaces lattice points in the crystal lattice formed by X and Mn.

11. An exchange coupling film according to claim 10, wherein the X or X+X' content in the antiferromagnetic material is in the range of 45 to 60 atomic percent.

12. An exchange coupling film according to claim 1, wherein at least part of the interface between the antiferromagnetic layer and the ferromagnetic layer is in a lattice-mismatching state.

13. A magnetoresistive element comprising:
an antiferromagnetic layer;
a pinned magnetic layer in contact with the antiferromagnetic layer, the magnetization vector of the pinned magnetic layer being pinned by an exchanged anisotropic magnetic field generated in relation to the antiferromagnetic layer;

a free magnetic layer formed on the pinned magnetic layer separated by a nonmagnetic interlayer therebetween; and bias layers for orienting the magnetization vector of the free magnetic layer in a direction substantially orthogonal to the magnetization vector of the pinned magnetic layer, wherein the antiferromagnetic layer and the pinned magnetic layer comprises an exchange coupling film according to claim 1, the pinned magnetic layer corresponding to the ferromagnetic layer.

14. A magnetoresistive element comprising:

an antiferromagnetic layer;

a pinned magnetic layer in contact with the antiferromagnetic layer, the magnetization vectors of the pinned magnetic layer being pinned by an exchange anisotropic magnetic field generated in relation with the antiferromagnetic layer;

a free magnetic layer formed on the pinned magnetic layer separated by a nonmagnetic interlayer; and antiferromagnetic exchange bias layers formed above or below the free magnetic layer, the exchange bias layers being separated from one another in a track width direction by a gap therebetween, wherein the exchange bias layers and the free magnetic layer comprise an exchange coupling film according to claim 1, the exchange bias layers corresponding to the antiferromagnetic layer and the free magnetic layer corresponding to the ferromagnetic layer.

15. A magnetoresistive element comprising:

nonmagnetic interlayers provided below and above a free magnetic layer;

pinned magnetic layers, one thereof being provided on the pinned magnetic layer formed on the free magnetic layer and the other being provided under the pinned magnetic layer formed under the free magnetic layer;

antiferromagnetic layers for pinning the magnetization vectors of the pinned magnetic layers, one of the antiferromagnetic layers being provided on one of the pinned magnetic layers and the other being provided under the other of the pinned magnetic layers; and bias layers for orienting the magnetization vector of the free magnetic layer in a direction substantially orthogonal to the magnetization vector of the pinned magnetic layer, wherein the antiferromagnetic layer and the pinned magnetic layer in contact with the antiferromagnetic layer comprise an exchange coupling film according to claim 1, the pinned magnetic layer corresponding to the ferromagnetic layer.

16. A magnetoresistive element comprising:

a magnetoresistive layer;

a soft magnetic layer provided on the magnetoresistive layer separated by a nonmagnetic layer therebetween; and antiferromagnetic layers provided above or below the magnetoresistive layer, the antiferromagnetic layers being separated from one another in a track width direction with a gap therebetween, wherein the antiferromagnetic layer and the magnetoresistive layer comprise an exchange coupling film according to claim 1, the magnetoresistive layer corresponding to the ferromagnetic layer.

* * * * *